(12) United States Patent
Yushin et al.

(10) Patent No.: US 11,374,215 B2
(45) Date of Patent: *Jun. 28, 2022

(54) SCAFFOLDING MATRIX WITH INTERNAL NANOPARTICLES

(71) Applicant: Sila Nanotechnologies Inc., Alameda, CA (US)

(72) Inventors: Gleb Yushin, Atlanta, GA (US); Bogdan Zdyrko, Atlanta, GA (US); Addison Shelton, Atlanta, GA (US); Eugene Berdichevsky, Alameda, CA (US); Igor Luzinov, Clemson, SC (US); Alexander Jacobs, Oakland, CA (US); Eerik Hantsoo, Oakland, CA (US); George Gomes, Alameda, CA (US)

(73) Assignee: SILA NANOTECHNOLOGIES, INC., Alameda, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/667,965

(22) Filed: Feb. 9, 2022

(65) Prior Publication Data

US 2022/0173384 A1 Jun. 2, 2022

Related U.S. Application Data

(63) Continuation of application No. 17/353,364, filed on Jun. 21, 2021, which is a continuation of application
(Continued)

(51) Int. Cl.
*H01M 4/13* (2010.01)
*H01M 4/36* (2006.01)
(Continued)

(52) U.S. Cl.
CPC ......... *H01M 4/364* (2013.01); *H01M 4/0402* (2013.01); *H01M 4/13* (2013.01);
(Continued)

(58) Field of Classification Search
CPC ...... H01M 4/364; H01M 4/0402; H01M 4/13; H01M 4/139; H01M 4/366; H01M 4/624;
(Continued)

(56) References Cited

U.S. PATENT DOCUMENTS 8,916,296 B2   12/2014  Feaver et al.
9,373,838 B2    6/2016  Yushin et al.
(Continued)

FOREIGN PATENT DOCUMENTS

CN      1891668 A      1/2007
WO   2004022637 A2     3/2004
(Continued)

*Primary Examiner* — Victoria H Lynch
(74) *Attorney, Agent, or Firm* — Muncy, Geissler, Olds & Lowe, P.C.; Daniel Podhajny

(57) ABSTRACT

A battery electrode composition is provided comprising composite particles, with each composite particle comprising active material and a scaffolding matrix. The active material is provided to store and release ions during battery operation. For certain active materials of interest, the storing and releasing of the ions causes a substantial change in volume of the active material. The scaffolding matrix is provided as a porous, electrically-conductive scaffolding matrix within which the active material is disposed. In this way, the scaffolding matrix structurally supports the active material, electrically interconnects the active material, and accommodates the changes in volume of the active material.

22 Claims, 14 Drawing Sheets

US 11,374,215 B2
Page 2

Related U.S. Application Data

No. 16/419,806, filed on May 22, 2019, now Pat. No. 11,101,458, which is a continuation of application No. 13/973,943, filed on Aug. 22, 2013, now Pat. No. 10,374,221.

(60) Provisional application No. 61/693,070, filed on Aug. 24, 2012.

(51) Int. Cl.
  H01M 4/04 (2006.01)
  H01M 4/139 (2010.01)
  H01M 4/62 (2006.01)
  H01M 4/38 (2006.01)
  H01M 4/48 (2010.01)
  H01M 10/052 (2010.01)
  H01M 10/054 (2010.01)

(52) U.S. Cl.
  CPC ........... H01M 4/139 (2013.01); H01M 4/366 (2013.01); H01M 4/624 (2013.01); H01M 4/625 (2013.01); H01M 4/38 (2013.01); H01M 4/48 (2013.01); H01M 10/052 (2013.01); H01M 10/054 (2013.01)

(58) Field of Classification Search
  CPC .......... H01M 4/625; H01M 4/38; H01M 4/48; H01M 10/052; H01M 10/054
  See application file for complete search history.

(56) References Cited

U.S. PATENT DOCUMENTS

| | | | |
|---|---|---|---|
| 10,374,221 B2 | 8/2019 | Yushin et al. | |
| 2004/0146560 A1 | 7/2004 | Whiteford et al. | |
| 2007/0122101 A1 | 5/2007 | Buretea et al. | |
| 2007/0281216 A1 | 12/2007 | Petrat et al. | |
| 2008/0145761 A1 | 6/2008 | Petrat et al. | |
| 2010/0151324 A1 | 6/2010 | Green et al. | |
| 2010/0178565 A1 | 7/2010 | Green | |
| 2010/0255376 A1 | 10/2010 | Park et al. | |
| 2011/0020701 A1 | 1/2011 | Park et al. | |
| 2011/0053765 A1 | 3/2011 | Feaver | |
| 2011/0223494 A1* | 9/2011 | Feaver ................ | H01M 4/382 429/525 |
| 2012/0081838 A1 | 4/2012 | Constantino et al. | |
| 2012/0100438 A1* | 4/2012 | Fasching ............. | H01M 4/1395 429/246 |
| 2012/0202033 A1 | 8/2012 | Chang et al. | |
| 2012/0208081 A1* | 8/2012 | Bartkowiak ........ | H01M 4/0404 428/473.5 |
| 2012/0262127 A1 | 10/2012 | Feaver | |
| 2013/0011726 A1* | 1/2013 | Takano ............... | C01G 45/1242 429/188 |
| 2013/0069601 A1 | 3/2013 | Coowar et al. | |
| 2013/0209348 A1 | 8/2013 | Ludvik et al. | |
| 2013/0211005 A1 | 8/2013 | Ludvik et al. | |
| 2013/0220817 A1* | 8/2013 | Walker ................ | H01M 4/0402 241/24.1 |
| 2013/0280601 A1 | 10/2013 | Geramita et al. | |
| 2014/0166939 A1 | 6/2014 | Park et al. | |
| 2014/0170498 A1 | 6/2014 | Park et al. | |
| 2014/0308585 A1 | 10/2014 | Han et al. | |
| 2014/0346618 A1 | 11/2014 | Lahlouh et al. | |
| 2014/0349183 A1 | 11/2014 | Macklin et al. | |
| 2015/0321920 A1 | 11/2015 | Geramita et al. | |
| 2016/0039970 A1 | 2/2016 | Kron et al. | |
| 2016/0133394 A1 | 5/2016 | Sakshaug et al. | |
| 2016/0344030 A1 | 11/2016 | Sakshaug et al. | |
| 2019/0305302 A1 | 10/2019 | Yushin et al. | |
| 2020/0014068 A1 | 1/2020 | Anderson et al. | |
| 2020/0287202 A1 | 9/2020 | Park et al. | |

FOREIGN PATENT DOCUMENTS

| | | | | |
|---|---|---|---|---|
| WO | 2004027822 A2 | 4/2004 | | |
| WO | 2005096414 A2 | 10/2005 | | |
| WO | 2006097380 A1 | 9/2006 | | |
| WO | 2007083155 A1 | 7/2007 | | |
| WO | 2009010758 A2 | 1/2009 | | |
| WO | WO-2011041468 A1 * | 4/2011 | ............ | H01M 4/133 |
| WO | 2011072256 A1 | 6/2011 | | |
| WO | 2011088472 A2 | 7/2011 | | |
| WO | 2011112992 A1 | 9/2011 | | |
| WO | 2011154692 A1 | 12/2011 | | |
| WO | 2012045002 A1 | 4/2012 | | |
| WO | 2012054766 A2 | 4/2012 | | |
| WO | 2012092210 A1 | 7/2012 | | |
| WO | 2013106782 A2 | 7/2013 | | |
| WO | 2013120009 A1 | 8/2013 | | |
| WO | 2013120011 A1 | 8/2013 | | |
| WO | 2013120028 A1 | 8/2013 | | |
| WO | 2013128201 A3 | 9/2013 | | |
| WO | 2014082086 A1 | 5/2014 | | |
| WO | 2014143213 A1 | 9/2014 | | |
| WO | 2014158729 A1 | 10/2014 | | |
| WO | 2014160105 A1 | 10/2014 | | |
| WO | 2014160385 A3 | 10/2014 | | |
| WO | 2014201275 A2 | 12/2014 | | |

* cited by examiner

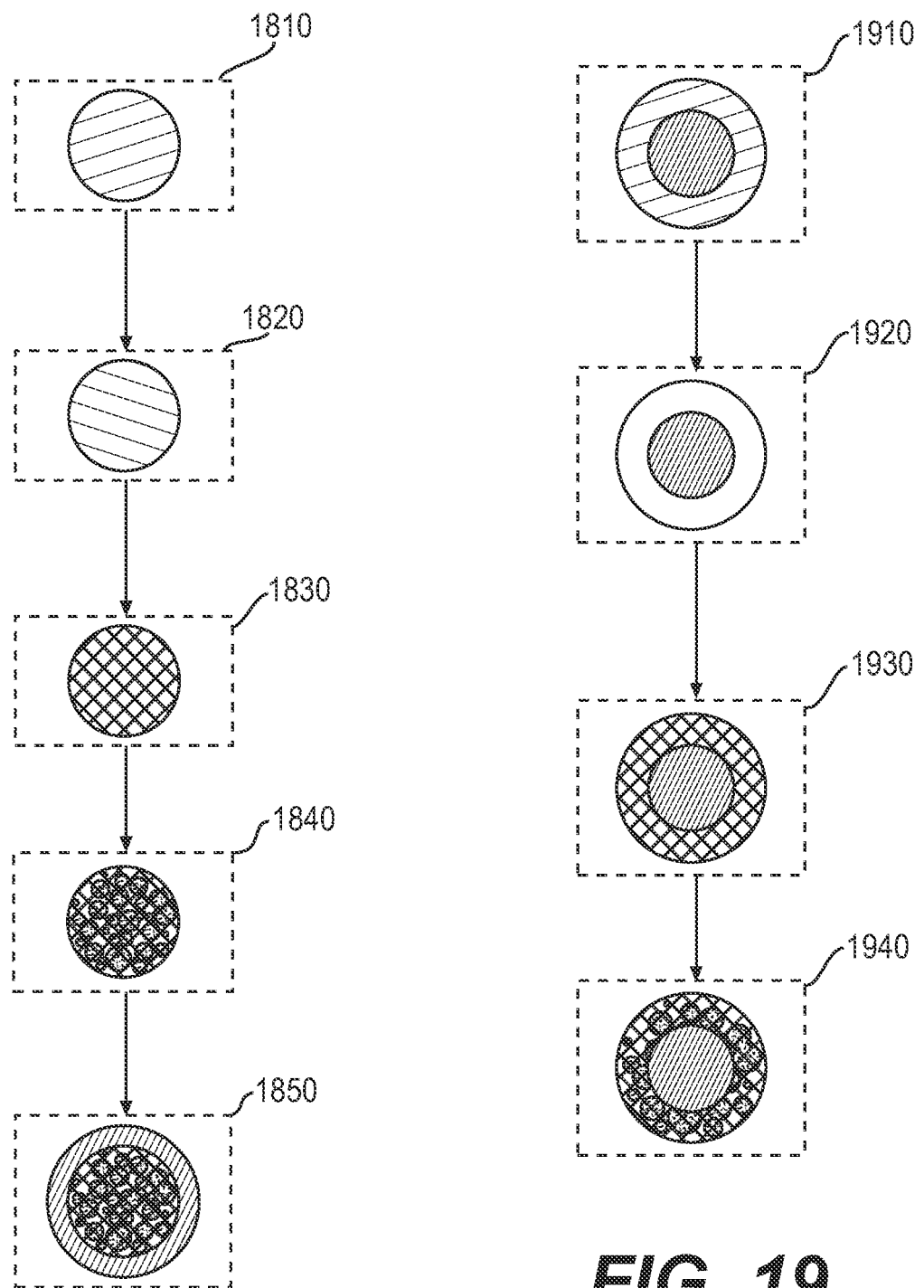

SCAFFOLDING MATRIX WITH INTERNAL NANOPARTICLES

CROSS REFERENCE TO RELATED APPLICATIONS

The present application for patent is a Continuation of U.S. patent application Ser. No. 17/353,364, entitled "Scaffolding Matrix with Internal Nanoparticles" filed on Jun. 21, 2021, which is a Continuation of U.S. patent application Ser. No. 16/419,806 entitled "Scaffolding Matrix with Internal Nanoparticles" filed on May 22, 2019, which is a Continuation of U.S. patent application Ser. No. 13/973,943 entitled "Scaffolding Matrix with Internal Nanoparticles" filed on Aug. 22, 2013, which claims priority to Provisional Application No. 61/693,070 entitled "Scaffolding Matrix with Internal Nanoparticles" filed on Aug. 24, 2012, each of which is expressly incorporated by reference herein.

GOVERNMENT LICENSE RIGHTS

This invention was made with government support under Award ID DE-AR0000265 awarded by the Advanced Research Projects Agency-Energy (ARPA-E) within the United States Department of Energy (DOE). The government has certain rights in the invention.

BACKGROUND

Field

The present disclosure relates generally to energy storage devices, and more particularly to metal-ion battery technology and the like.

Background

Owing in part to their relatively high energy densities, light weight, and potential for long lifetimes, advanced metal-ion batteries such as lithium-ion (Li-ion) batteries are desirable for a wide range of consumer electronics. However, despite their increasing commercial prevalence, further development of these batteries is needed, particularly for potential applications in low- or zero-emission hybrid-electrical or fully-electrical vehicles, consumer electronics, energy-efficient cargo ships and locomotives, aerospace applications, and power grids.

Materials that offer high capacity for such batteries include conversion-type electrodes (e.g., metal fluorides, sulfides, oxides, nitrides, phosphides and hydrides and others for Li-ion batteries), alloying-type electrodes (e.g., silicon, germanium, tin, lead, antimony, magnesium and others for Li-ion batteries) and others. The majority of such materials suffer from several limitations for various metal-ion battery chemistries, including: (i) low electrical conductivity, which limits their utilization and both energy and power characteristics in batteries; (ii) low ionic conductivity, which limits their utilization and both energy and power characteristics in batteries; (iii) volume changes during metal ion insertion/extraction, which may cause mechanical and electrical degradation in the electrodes and (particularly in the case of anode materials) degradation in the solid-electrolyte interphase (SEI) during battery operation; and (iv) changes in the chemistry of their surfaces, which may weaken the strength of (or even break) the particle-binder interface, leading to electrode and battery degradation.

Decreasing particle size decreases the ion diffusion distance, and offers one approach to addressing the low ionic conductivity limitation. However, nanopowders suffer from high electrical resistance caused by the multiple, highly resistive point contacts formed between the individual particles. In addition, small particle size increases the specific surface area available for undesirable electrochemical side reactions. Furthermore, simply decreasing the particle size does not address and may in some cases exacerbate other limitations of such materials, such as volume changes and changes in the external surface area of the particles, as well as weakening of the particle-binder interfaces.

Certain high capacity materials, such as sulfur (S), additionally suffer from the dissolution of intermediate reaction products (e.g., metal polysulfides) in the battery electrolyte, which further contributes to their degradation. Although sulfur incorporation into porous carbons via melt-infiltration has been shown to reduce dissolution and increase electrical conductivity of S-based cathodes, such techniques are narrowly tailored to a limited set of materials with low melting points like sulfur (about 115° C.) and to a limited set of producible structures (e.g., conformal coatings).

Accordingly, there remains a need for improved batteries, components, and other related materials and manufacturing processes.

SUMMARY

Embodiments disclosed herein address the above stated needs by providing improved battery components, improved batteries made therefrom, and methods of making and using the same.

A battery electrode composition is provided comprising composite particles, with each composite particle comprising active material and a scaffolding matrix. The active material is provided to store and release ions during battery operation. For certain active materials of interest, the storing and releasing of the ions causes a substantial change in volume of the active material. The scaffolding matrix is provided as a porous, electrically-conductive scaffolding matrix within which the active material is disposed. In this way, the scaffolding matrix structurally supports the active material, electrically interconnects the active material, and accommodates the changes in volume of the active material.

A method of fabricating a battery electrode composition comprising composite particles is also provided. The method may comprise, for example: providing an active material to store and release ions during battery operation, whereby the storing and releasing of the ions causes a substantial change in volume of the active material; and forming a porous, electrically-conductive scaffolding matrix within which the active material is disposed, wherein the scaffolding matrix structurally supports the active material, electrically interconnects the active material, and accommodates the changes in volume of the active material.

BRIEF DESCRIPTION OF THE DRAWINGS

The accompanying drawings are presented to aid in the description of embodiments of the invention and are provided solely for illustration of the embodiments and not limitation thereof.

FIG. 18 is a graphical flow diagram from a cross-sectional perspective depicting formation of an example composite particle of the type illustrated in FIG. 1 or 3 according to certain example embodiments.

FIG. 19 is a graphical flow diagram from a cross-sectional perspective depicting formation of an example composite particle of the type illustrated in FIG. 8 according to certain example embodiments.

DETAILED DESCRIPTION

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details.

The present disclosure provides for advanced composite materials for battery electrodes formed from a porous, electrically-conductive "scaffolding" matrix having active material(s) incorporated therein. As discussed in more detail below, several advantages over conventional designs are provided by incorporating active material into this type of scaffolding matrix. For example, deposition of the active material inside a scaffolding matrix (as opposed to surface deposition) helps avoid the often undesirable agglomeration of individual active material particles.

Further, a portion of the scaffolding matrix can be left exposed and, therefore, used for the stable attachment of a (polymer) binder. A more stable particle-binder interface may lead to more stable performance of the electrode. The outer surface area of the scaffolding matrix can also be used for the deposition of an ionically conductive (and solvent impermeable) outer shell, thereby sealing the active material deposited inside the scaffolding matrix and avoiding the often undesirable contact of active material with solvent molecules of the electrolyte.

The scaffolding matrix may also be used to electrically connect individual active (nano)particles, which is important for higher utilization of the active particles. Furthermore, the scaffolding matrix may be capable of maintaining such electrical connectivity even in cases when active particles change dimensions during insertion and extraction of ions (during the battery operation, such as during charging and discharging).

Figure 1:
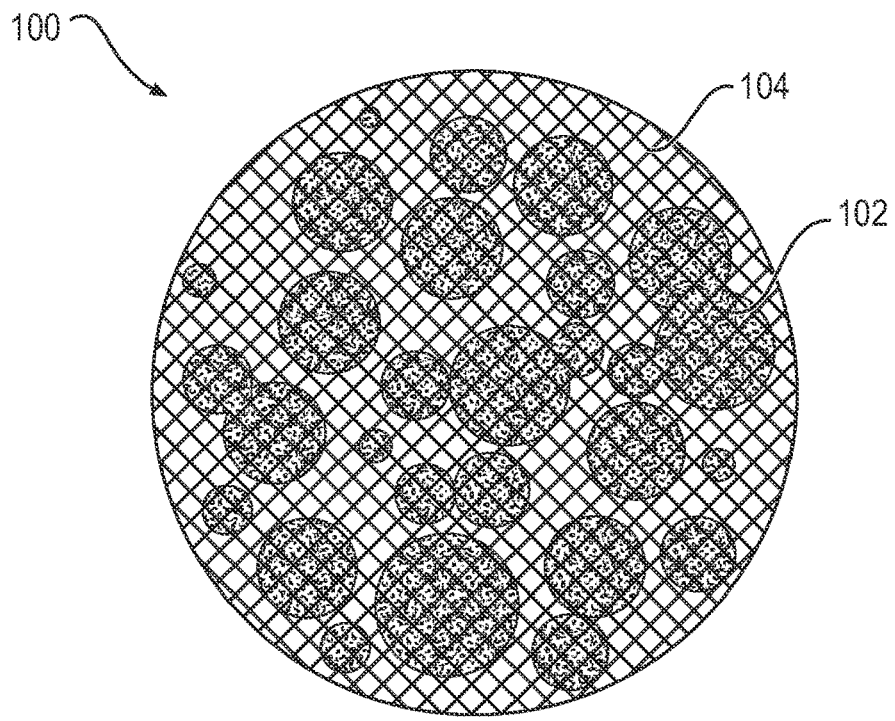
FIG. 1 illustrates an example battery electrode composition according to certain example embodiments.

FIG. 1 illustrates an example battery electrode composition according to certain example embodiments. Here, an individual composite particle 100 is shown for illustration purposes. A battery electrode may be formed from a collection of such composite particles 100 (e.g., agglomerated onto a current collector or the like) as appropriate for a given application. The spherical shape is shown for illustration purposes only, but may be beneficial for some applications.

The composite particle 100 includes an active material 102 and a porous, electrically-conductive scaffolding matrix 104. In this example, the active material 102 is illustrated as a collection of individual active (nano)particles. In general, the characteristic dimensions of the individual active particles (e.g., a diameter of individual active particles, in an idealized spherical case) may be in the range of about 0.1% to about 50% of the characteristic dimensions of the composite particle 100. The active material 102 is provided to store and release ions during battery operation.

As discussed above, for certain active materials of interest (e.g., silicon), the storing and releasing of these ions (e.g., Li ions in a Li-ion battery) causes a substantial change in volume of the active material, which, in conventional designs, may lead to irreversible mechanical damage, and ultimately a loss of contact between individual electrode particles or between the electrode and underlying current collector. Moreover, it may lead to continuous growth of the solid-electrolyte interphase (SEI) around such volume-changing particles. The SEI growth, in turn, consumes ions and reduces cell capacity.

The porous, electrically-conductive scaffolding matrix 104 is provided to address these issues by having the active material 102 disposed within its framework. In this way, the scaffolding matrix 104 structurally supports the active material 102, electrically interconnects the active material 102, and accommodates the changes in volume of the active material 102 discussed above. In general, the composite particles 100 may be able to accommodate changes in volume of the active material 102 during battery operation that exceed a corresponding change in volume of the scaffolding matrix 104 by more than 100%.

More specifically, the use of a porous, electrically-conductive scaffolding matrix in this manner provides several advantages, including: (i) it electrically interconnects active particles; (ii) it provides volume for particle expansion upon insertion of metal ions; (iii) it may provide paths for rapid access of ions into the surface of the particles; (iv) it provides a foundation for the deposition of an outer shell permeable to metal ions but not permeable to solvent molecules; (v) it provides sites for the stable attachment of a polymer binder; and (vi) it supports facile routes for incorporation of the active particles/materials via impregnation strategies.

Such advantages are provided for a wide range of high capacity anode and cathode materials, and particularly for high melting point materials (such as materials with a melting point greater than about 600° C.), although low melting point materials (such as Sn and In) may also benefit from various aspects of the disclosed techniques. In addition, advantages are particularly provided for high capacity anode and cathode materials that exhibit significant volume changes (e.g., greater than about 10%) upon insertion and extraction of ions (e.g., metal ions). For anodes that can be used in metal-ion (e.g. Li-ion) batteries, examples include but are not limited to: heavily doped, doped and undoped Si, In, Sn, Sb, Ge, Mg, Pb, their alloys with other metals and semimetals, their mixtures with other metals, metal oxides, metal fluorides, metal oxy-fluorides, metal nitrides, metal phosphides, metal sulfides and semiconductor oxides. For cathodes that can be used in metal-ion (e.g. Li-ion) batteries, examples include but are not limited to: metal sulfides, metal fluorides, metal oxy-fluorides, and their mixtures, to name a few.

Even for high capacity (e.g., greater than about 250 mAh/g for Li-ion battery cathodes and greater than about 400 mAh/g for Li-ion battery anodes) electrode particles that do not experience dissolution during battery operation, stability as well as power characteristics may be greatly improved by the designs herein. This is particularly true for active materials having low electrical conductivity (e.g., less than about 5 S/m) or active materials having a low diffusion coefficient for the metal ions employed (e.g., less than about $10^{-11}$ cm$^2$/S).

It will be appreciated that various metal ions may be utilized in conjunction with the electrode material designs described herein. Examples include but are not limited to: Li$^+$, Na$^+$, Mg$^{2+}$, Ca$^{2+}$, and Al$^{3+}$. The designs herein may be particularly attractive for metal ions with an ion size larger than that of Li$^+$ or an ion charge larger than +1. The present invention is not limited to metal-ion batteries (and thus not limited to metal ions), however, and can be used in other battery chemistries where active particles undergo significant volume changes during their operation (e.g., reversible reduction-oxidation reactions), including, for example, aqueous electrolyte-containing batteries.

Returning to FIG. 1, it is noted that the desired pore size within the scaffolding matrix 104 may vary based on the desired application and corresponding materials employed. In general, it may be advantageous that the total volume of all the pores within the scaffolding matrix 104 is made sufficient to provide space for the volume expansion of the active material 102 during ion insertion. For active nanoparticles with characteristic dimensions typically on the order of about 3-100 nm, pores in the range of about 0.4 nm to about 50 nm have been found to work well. In some cases, the combination of micropores (e.g., less than about 2 nm) and mesopores (e.g., on the order of about 2-50 nm) within the scaffolding matrix 104 may be further beneficial, while in other designs, it may be advantageous to simply employ mesopores. As an example, a volume of mesopores within a porous (e.g., carbon) matrix in excess of about 0.05 cc/g$_{(Carbon)}$ has been found to work well.

In some designs, it may be advantageous for high capacity active particles embedded into a scaffolding matrix to be formed in such a way that a portion of the scaffolding matrix penetrates into the active particles (e.g., such that the particles are formed around one or more scaffold pore walls) or that the individual high capacity active particles connect several pore walls of the scaffolding matrix. This helps enhance the structural and electrical stability of the composite during battery operation and expansion/contraction of the active particles during insertion and extraction of ions.

One example of a scaffolding matrix material that may be employed in various designs is a porous carbon material. However, various other porous, electrically-conductive materials may also be employed. For example, conductive porous polymer scaffold particles may be used instead of porous carbon scaffold particles in other designs. Further, in some designs it may be advantageous to introduce additional functional groups or other materials into the inner surface of the scaffolding matrix in order to encourage, for example, heterogeneous nucleation (or attachment) of nanoparticles of the active material inside. Doping of either a porous carbon or a produced composite with elements (such as nitrogen) that enhance the composite electrical or ionic conductivity may also be beneficial for using these composites in electrodes of metal-ion batteries. For certain applications in Li-ion batteries, it may also be advantageous to introduce Li into, for example, a porous carbon-nanoparticle composite. Similarly, in applications of the composite material in batteries based on other metals, it may be advantageous to introduce the same metal as the ions utilized into the scaffolding matrix.

Several example methods of fabrication for an active material infused scaffolding matrix are described below. The fabrication techniques allow efficient and controlled incorporation of nanoparticles of electrochemically active battery materials with high melting points (e.g., greater than about 600° C.), for example, or with no melting point (when the materials would simply decompose at high temperature), into a porous carbon matrix, by way of example.

In one example, active nanoparticles may be introduced into a pre-fabricated porous carbon matrix/scaffold particles via chemical vapor deposition (CVD). Porous carbon particles may be fabricated by chemical synthesis or precipitation driven fabrication or combination of the chemical and precipitation methods of polymeric precursor particles, their pyrolysis (thermal treatment) and activation (partial oxidation to introduce or increase the volume of interconnected pores). Desired pore sizes and their distribution may be achieved, for example, by a combination of porosity in the polymer precursor and a carbon activation process. Another way to produce porous carbon scaffolds includes synthesis of a large polymer monolith, its carbonization, and mechanical grinding of the carbon monolith into particles of the desired shape. The activation process may involve physical oxidation with oxygen-containing gases (such as $CO_2$, $H_2O$, air, $O_2$, etc.), chemical activation (e.g., with KOH) or a combination of these approaches. The activation may be performed during or after the thermal treatment. In order to introduce both micropores and mesopores (which may in some cases be beneficial, as discussed above), carbon activation may be performed at different temperatures (e.g., at about 800 and about 1000° C.) or using different activation agents (e.g., $CO_2$ and $H_2O$). In some cases, it may be beneficial to introduce mesopores into the porous carbon by utilizing a mixture of two polymers (or carbon yielding polymer mixture with organic liquid) within the polymeric precursor particles. In some cases, the organic liquid can be a non-solvent for the polymer or the polymer can be swollen in that liquid. The non-solvent/solvent nature of the liquid will define the pore sizes and distribution of the pores. One of the polymers can be either removed after synthesis of the polymeric particles by selective extraction or one of the polymers may inherently exhibit low thermal stability or very low carbon yield during carbonization or after activation, or both. In some cases, pores may be introduced into the surface of dense carbon particles (such as synthetic or artificial graphite, mesocarbon microbeads, etc.). In one example, metal or other inorganic nanoparticles may be pre-deposited on the surface of carbon to serve as catalysts for etching or oxidation of pores within the carbon. In another example, extractable, non-carbonizing nanoparticles may be introduced into the polymer particles subjected to carbonizations. In other examples, a carbon porous scaffold may be made by carbon deposition (CVD for example) on a highly porous scaffold made from inorganic material. Silica aerogels are one example of such inorganic scaffolds for carbon deposition.

According to another example method, active particles may be introduced into a pre-fabricated porous carbon matrix via vapor infiltration and/or capillary condensation. This approach may be particularly attractive for materials that have high vapor pressure (e.g., greater than about 0.1 Pa) at moderately high temperatures (e.g., less than about 1000° C.).

According to another example method, active particles may be introduced by: (i) dissolving active particles or active particle precursors in a solvent; (ii) infiltration of the solution into the pores of a pre-fabricated porous carbon matrix under normal pressure, at increased pressure, or under vacuum; (iii) evaporation of the solvent; and (iv) (if needed) transformation of the precursor into the active particles. In some cases, some of the above steps may be repeated to increase the total amount of the introduced nanoparticles of active material into the porous carbon matrix.

According to another example method, active particles may be introduced by: (i) dissolving active particles or active particle precursors in a solvent; (ii) infiltration of the solution into the pores of a pre-fabricated porous carbon matrix under normal pressure, at increased pressure, or under vacuum; (iii) heterogeneous precipitation of nanoparticles on the inner carbon surface from the solution by, for example, adding a non-solvent, changing the ionic strength or the pH of the solution, or changing the temperature/pressure of the system; and (iv) (if needed) transformation of the precursor into the active particles. In some cases, some of the above steps may be repeated or combined to increase the total amount of the introduced nanoparticles of active material into the porous carbon matrix.

According to another example method, active particles are introduced by infiltration of nanoparticles of active materials into the pores of pre-formed porous carbon using a suspension infiltration method under normal pressure or at increased pressures or under vacuum.

According to another example method: (i) active nanoparticles may first be adsorbed onto the surface of the nanoparticles of a polymeric precursor for carbon formation (e.g., by introduction of the opposite charge on the surface of the active nanoparticles and the surface of the polymer precursor nanoparticles); (ii) thermal treatment that induces carbonization of the polymer precursor and the formation of the nanocomposite comprising active nanoparticles, carbon, and nanopores; and (iii) optional activation to increase the volume of pores. In another example, after the nanoparticle deposition, the composite polymer particles may be covered with another carbon-forming or non-carbon forming polymer layer by the electrostatic adsorption of a polymer having opposite surface charge than that of the particles.

According to another example method: (i) active nanoparticles and polymer precursor nanoparticles may be coagulated heterogeneously from a solution/suspension to form larger composite-precursor particles; (ii) thermal annealing (carbonization) to form the nanocomposite with nanoparticles uniformly distributed within carbon and pores; and (iii) optional activation to increase the volume of pores.

According to another example method, the following may be performed: (i) active nanoparticles may first be dispersed in a monomer or polymer solution; (ii) the produced suspension may be emulsified (e.g., in water) to produce spherical nanoparticle-polymer colloids in water; (iii) the monomer in the colloids may be polymerized (or solvent may be extracted from a polymer solution) to produce the spherical composite particles composed of active nanoparticles and a polymer; (iv) upon water evaporation the composite particles may be carbonized; and (v) the produced carbon-active nanoparticle composite may (optionally) be activated to increase the volume of pores. In another example, polymerization may be conducted in a non-aqueous solvent for a monomer, which is a non-solvent for the polymer being synthesized. During the polymerization, the polymer particles may be formed by a precipitation mechanism. In the course of the precipitation, polymerization of the active nanoparticles becomes captured inside the polymer particles. Upon particle separation, the composite particles may be carbonized.

According to another example method, the following may be performed: (i) water with active particle precursors may be emulsified in a monomer solution; (ii) the produced mixture may be emulsified in water again to produce colloids of the monomer solution (inside of which there are colloids of active particle precursor); (iii) the monomer may be polymerized producing near-spherical polymer particles containing the distribution of precursors of active particles; (iv) the produced emulsion may be dried, calcinated/carbonized to produce porous carbon particles with incorporated nanoparticles of active material; and (v) the produced carbon-active nanoparticle composite may (optionally) be activated to increase the volume of pores. An analogous approach can be realized in a non-aqueous medium as mentioned above.

According to another example method, the following may be performed: (i) an active particle precursor may be dissolved in an organic solvent along with a suitable carbon forming polymer; (ii) the homogeneous solution may be mixed with an excess of a non-solvent for the particle precursor and the polymer, and composite particles may be formed by precipitation; (iii) the produced particles may be dried, calcinated/carbonized to produce porous carbon particles with incorporated nanoparticles of active material. In another example, the precipitation may be conducted via changing ionic strength or pH of the solution, or changing temperature/pressure of the system.

In some designs as provided for herein, electrode stability may be further enhanced by a "shell" coating, such as an additional ion (e.g., a metal ion in case of a metal-ion battery, such as a Li ion in case of a Li-ion battery) permeable but electrolyte solvent impermeable, thin layer coating (e.g., on the order of about 1-50 nm).

Figure 2:
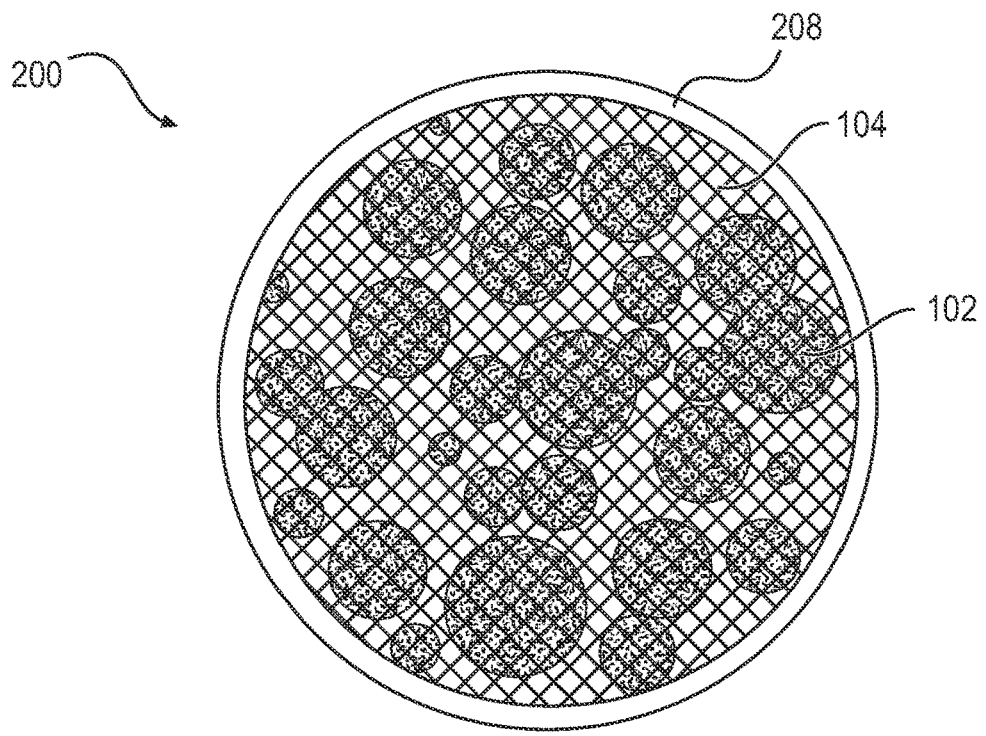
FIG. 2 illustrates an example battery electrode composition design further incorporating a functional shell according to other example embodiments.

FIG. 2 illustrates an example battery electrode composition design further incorporating a functional shell according to other example embodiments. As shown, the composite particle 200 of FIG. 2 includes the active material 102 and the porous, electrically-conductive scaffolding matrix 104 within which the active material 102 is disposed, as in the design of FIG. 1, and further includes a shell 208 at least partially encasing the active material 102 and the scaffolding matrix 104. In general, the shell 208 is made substantially permeable to the ions stored and released by the active material 102, but may otherwise provide different functionality as desired for different applications.

In the particular example illustrated in FIG. 2, the shell 208 is specifically, or otherwise includes, a protective layer formed from a material that is substantially impermeable to electrolyte solvent molecules. In the case of a low-voltage anode used in metal-ion batteries, such as an anode with a reduction-oxidation reaction occurring below about 1 V vs. Li/Li+ in a Li-ion battery, the protective layer of the shell 208 also provides a more stable outer surface for the SEI layer to form on during initial ion insertion, preventing mechanical changes and breakage during subsequent cycles. It may be advantageous to have a protective layer (such as carbon) on the active material that is more compatible with traditional electrolytes (e.g., electrolytes comprising carbonate solvents, such as ethylene carbonate (EC) or fluoroethylene carbonate (FEC) in the case of Li-ion battery applications), that does not change dimensions significantly (e.g., by more than about 10%) during charge-discharge cycling, in contrast to, for example, silicon (which changes dimensions dramatically, by over 200% in the case of metal ion insertion to the theoretically maximum level), and that is known to form a more stable SEI from the beginning.

Other types of shells and layers of shell materials may be employed for various purposes in different applications.

Figure 3:
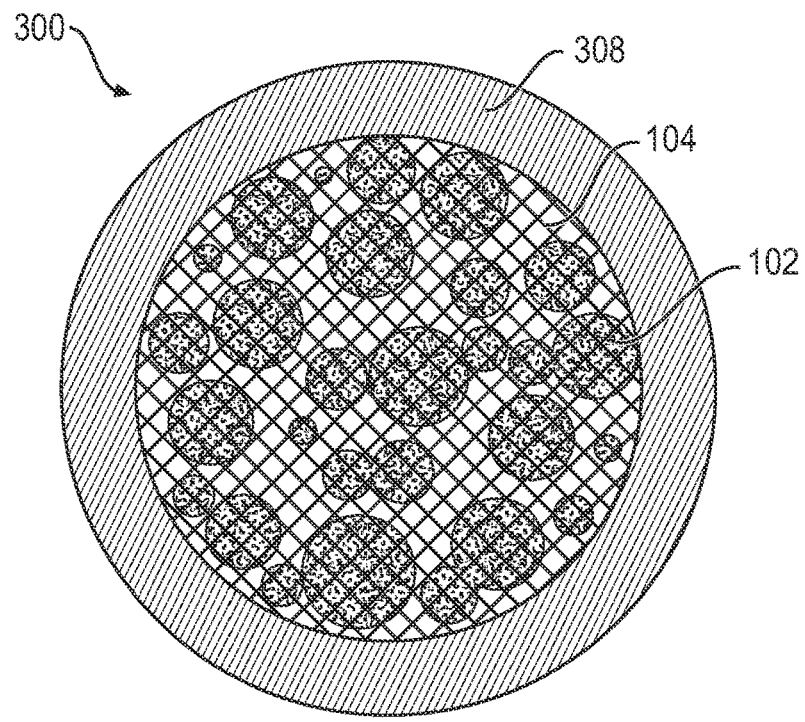
FIG. 3 illustrates another example battery electrode composition design incorporating a functional shell according to other example embodiments.

FIG. 3 illustrates another example battery electrode composition design incorporating a functional shell according to other example embodiments. As shown, the composite particle 300 of FIG. 3 includes the active material 102 and the porous, electrically-conductive scaffolding matrix 104 within which the active material 102 is disposed, as well as a shell 308 at least partially encasing the active material 102 and the scaffolding matrix 104. Here, the shell 308 includes an active material layer, rather than a protective layer as in the design of FIG. 2. It may be advantageous for the active material 102 disposed within the scaffolding matrix to be formed from a first active material while the active material shell layer 308 is formed from a second active material.

In general, two types of active materials may be utilized in such composites: (i) a so-called "high-capacity" active material, which undergoes significant volume changes during battery (or other electrochemical energy storage device) operation (e.g., greater than about 10%) and (ii) a "regular" or "moderate-to-low capacity" active material, which undergoes small volume changes during battery (or other electrochemical energy storage device) operation (e.g., smaller than about 8%). One common example of a "regular" active material is an "intercalation-type" material, where the electrolyte ions are inserted/extracted to/from the small openings (e.g., interstitial positions) existing in such a material. In the case of a Li-ion battery, lithium metal oxides (such as lithium cobalt oxides, lithium manganese oxides, lithium manganese cobalt oxides, lithium manganese nickel cobalt oxides, lithium metal phosphates, to name a few) are among examples of such "intercalation-type" cathode materials and graphite or lithium titanate are among examples of such "intercalation-type" anode materials. In the case of a Li-ion battery, conversion-type electrodes (such as metal fluorides, sulfides, oxides, nitrides, phosphides, and hydrides) or alloying-type electrodes (e.g., silicon, germanium, tin, lead, antimony, magnesium, and others) are among examples of such "high-capacity" active materials.

Accordingly, returning to FIG. 3, it may be advantageous to use two different active materials for the active material 102 and the active material shell layer 308. In particular, the first active material for the active material 102 may be selected as a high capacity active material having a substantially higher capacity relative to the second active material of the active material shell layer 308, which may be selected as a moderate-to-low capacity active material. In this way, a hybrid structure is provided that advantageously combines the high capacity materials discussed above with low-to-moderate capacity active material(s) (e.g., less than about 400 mAh/g for Li-ion battery anodes and about 250 mAh/g for Li-ion battery cathodes).

The low-to-moderate capacity (e.g., intercalation-type) layer may provide high rate capability to the composite, while the higher capacity active nanoparticles enhance the (ion storage) energy storage properties of the composite. As a result, battery electrodes produced from composites of this type comprising a low capacity shell layer and high capacity active nanoparticles distributed within a porous scaffolding matrix may offer higher energy density than conventional intercalation type electrodes and higher power density than electrodes composed of high capacity nanoparticles alone. In addition, such composites may offer enhanced structural stability because the low capacity shell layer commonly exhibits small volume changes (below about 8 vol. %) during battery operation.

Figure 4:
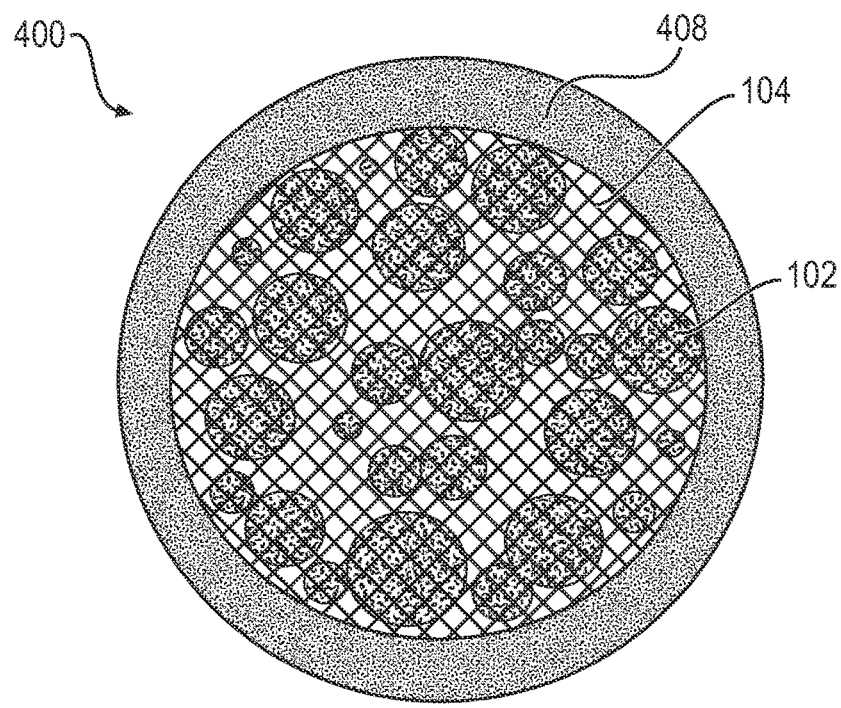
FIG. 4 illustrates another example battery electrode composition design incorporating a functional shell according to other example embodiments.

FIG. 4 illustrates another example battery electrode composition design incorporating a functional shell according to other example embodiments. As shown, the composite particle 400 of FIG. 4 includes the active material 102 and the porous, electrically-conductive scaffolding matrix 104 within which the active material 102 is disposed, as well as a shell 408 at least partially encasing the active material 102 and the scaffolding matrix 104. Here, the shell 408 includes a porous layer (e.g., an electrically and ionically conductive porous carbon), rather than a protective layer as in the design of FIG. 2 or an active material layer as in the design of FIG. 3. In some designs, it may be advantageous to provide the porous shell layer 408 with a different porosity as compared to the scaffolding matrix 104, and in particular, a smaller average pore size than the scaffolding matrix 104.

In this way, advantages may be provided by having two types of porous structures within a composite particle—one type in the core of the composite particle and another type in the shell layer of the composite particle. The core part can, for example, have larger pores and/or a larger fraction of the pores to maximize the volume fraction of the composite particle filled with high capacity active nanoparticles. The outer shell layer can, for example, have smaller or fewer pores and a more rigid structure, which helps improve mechanical stability of the overall composite particle. The outer shell layer may also have a different microstructure and surface chemistry, so that when infiltrated with high capacity active nanoparticles, most of the nanoparticles will nucleate and grow in the core within the scaffolding matrix. In this case, the shell layer may have a smaller fraction of the high volume-changing high capacity active particles, which again, in turn, improves the stability of the composite.

As discussed above with reference to FIG. 3, certain advantages may be provided by using two different types of active materials in a composite particle in order to take advantages of their respective properties while mitigating their respective drawbacks. Accordingly, when a porous shell layer is employed as in the design of FIG. 4, a second active material may be integrated into the resultant composite structure via the pores of the shell. This arrangement is discussed in more detail below.

Figure 5:
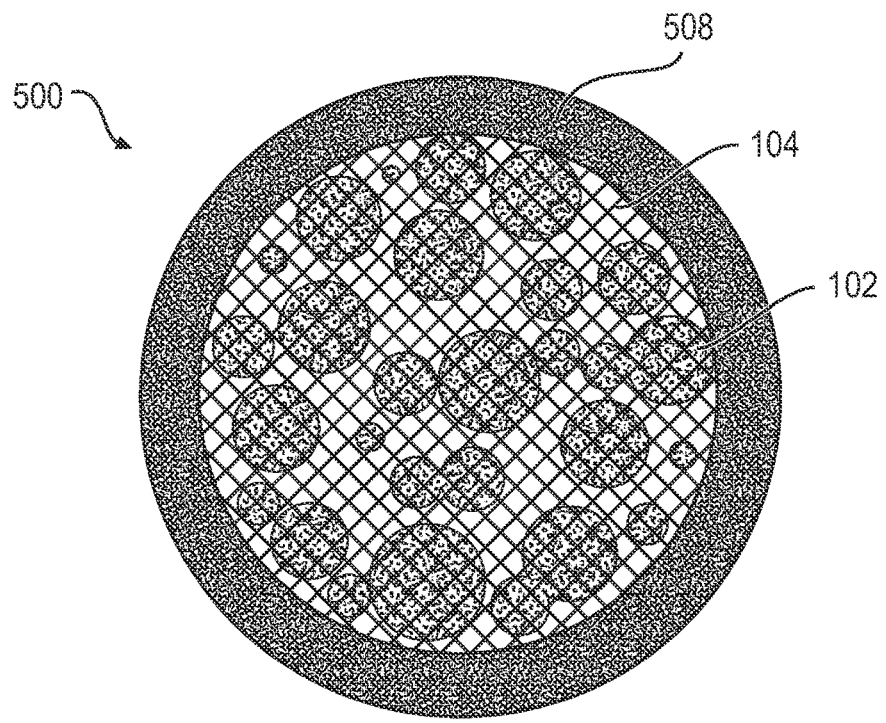
FIG. 5 illustrates another example battery electrode composition design incorporating a functional shell with a second active material according to other example embodiments.

FIG. 5 illustrates another example battery electrode composition design incorporating a functional shell with a second active material according to other example embodiments. As shown, the composite particle 500 of FIG. 5 includes the active material 102 and the porous, electrically-conductive scaffolding matrix 104 within which the active material 102 is disposed, as well as a shell 508 at least partially encasing the active material 102 and the scaffolding matrix 104. Here, the shell 508 includes a porous layer, as in the design of FIG. 4, but the pores of the porous layer are at least partially filled with a second active material different from the active material 102 disposed within the scaffolding matrix 104. Thus, in this example, the active material 102 disposed within the scaffolding matrix 104 may be formed from a first active material while at least some pores in the porous layer of the shell 508 are infiltrated with a second active material.

As an example, the porous layer of the shell 508 may be infiltrated with a low-to-medium capacity (e.g., intercalation-type) active material that experiences small volume changes during cycling. In some applications (e.g., if used as an anode in Li-ion batteries that form an SEI during battery operation), this arrangement may further provide a stable platform on which to form an electrolyte solvent impermeable layer to prevent solvent permeation into the scaffolding matrix. In cases where the porous layer material of the shell has a higher conductivity than the low-to-medium capacity active material, the active-material infiltrated shell in the design of FIG. 5 may provide improved conductivity compared to a pure active material layer shell as in the design of FIG. 3.

In still other embodiments, the shell may be a composite material comprising multiple layers, such as two or more of the functional layers described above, or other layers as desired for a given application.

Figure 6:
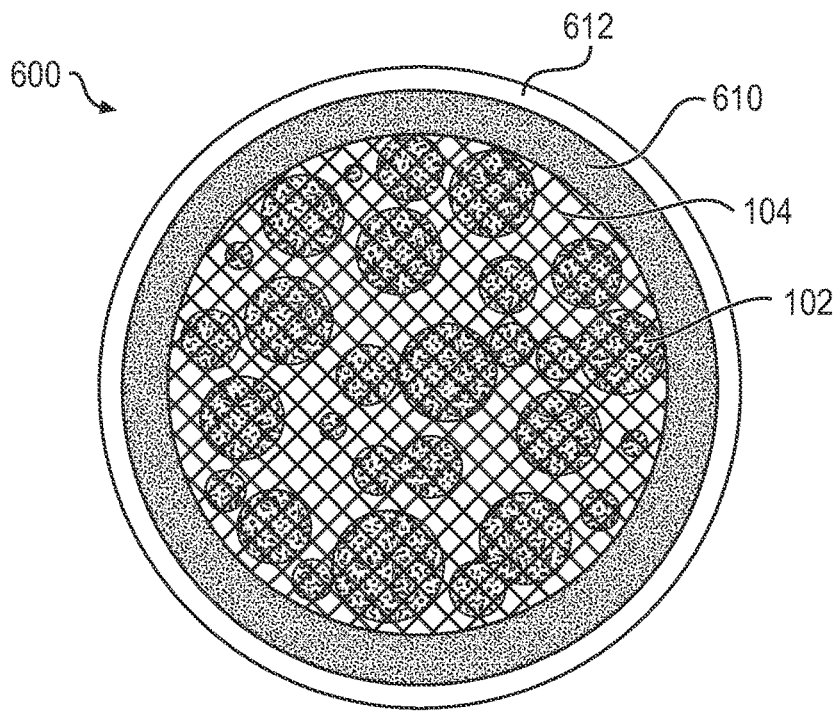
FIG. 6 illustrates an example battery electrode composition design incorporating a multi-layered functional shell according to other example embodiments.

FIG. 6 illustrates an example battery electrode composition design incorporating a multi-layered functional shell according to other example embodiments. As shown, the composite particle 600 of FIG. 6 includes the active material 102 and the porous, electrically-conductive scaffolding matrix 104 within which the active material 102 is disposed, as well as a multi-layered composite material shell having an inner layer 610 and an outer layer 612, each at least partially encasing the active material 102 and the scaffolding matrix 104. The two layers 610, 612 are shown for illustration purposes only, as additional intervening layers may be utilized as desired, and each layer may be selected to provide different functionality for different applications.

In the particular example illustrated in FIG. 6, the inner layer 610 is a porous layer having a smaller average pore size than the scaffolding matrix 104. Formation of an inner porous layer shell in this way, with pores sufficiently smaller than that of the underlying scaffolding matrix, may help simplify the deposition of additional outer layers. The outer layer 612 in this example is a protective layer formed from a material that is substantially impermeable to electrolyte solvent molecules, as in the design of FIG. 2.

Figure 7:
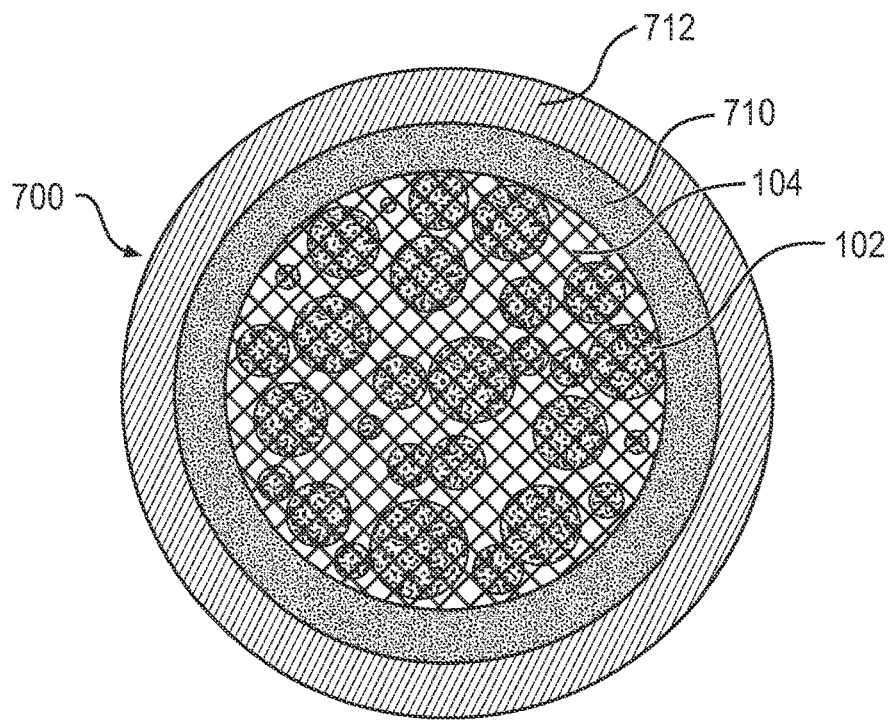
FIG. 7 illustrates another example battery electrode composition design incorporating a multi-layered functional shell according to other example embodiments.

FIG. 7 illustrates another example battery electrode composition design incorporating a multi-layered functional shell according to other example embodiments. As shown, the composite particle 700 of FIG. 7 includes the active material 102 and the porous, electrically-conductive scaffolding matrix 104 within which the active material 102 is disposed, as well as a multi-layered composite material shell having an inner layer 710 and an outer layer 712, each at least partially encasing the active material 102 and the scaffolding matrix 104. In the particular example illustrated in FIG. 7, the inner layer 710 is again a porous layer having a smaller average pore size than the scaffolding matrix 104, as in the design of FIG. 6. The outer layer 712 in this example, however, is an active material layer formed from an active material that is different from the active material disposed within the scaffolding matrix 104, as in the design of FIG. 3.

Figure 8:
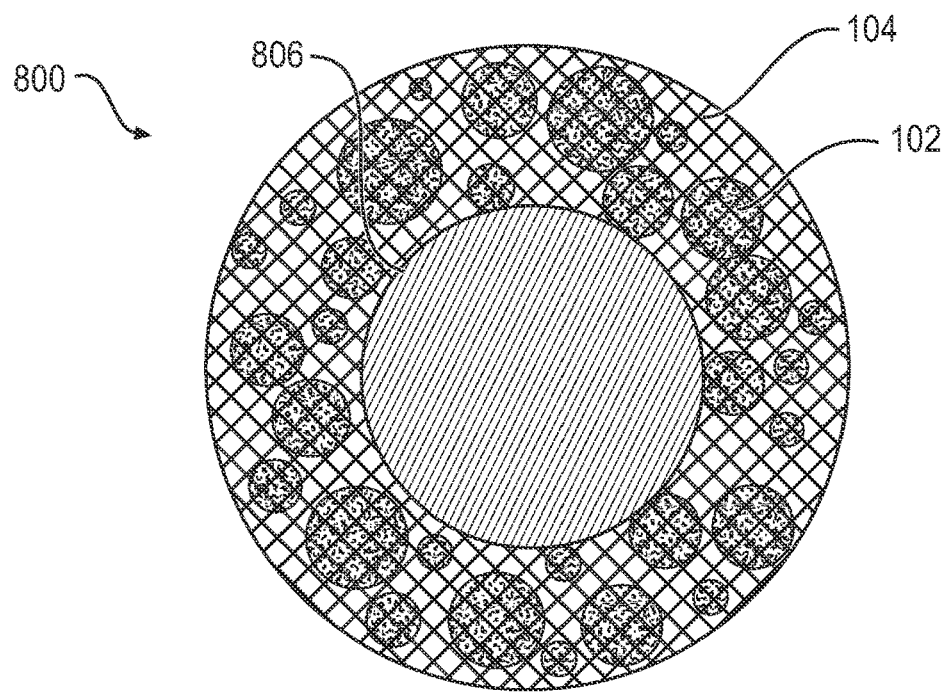
FIG. 8 illustrates an alternative example battery electrode composition design according to other example embodiments.

FIG. 8 illustrates an alternative example battery electrode composition design according to other example embodiments. As shown, the composite particle 800 of FIG. 8 includes the active material 102 and the porous, electrically-conductive scaffolding matrix 104 within which the active material 102 is disposed, as in the design of FIG. 1, but is formed around an active material core 806. Here, the active material 102 disposed within the scaffolding matrix 104 may be formed from a first active material while the active material core 806 may be formed from a second active material.

As discussed above in relation to the active material shell layer 308 of FIG. 3, it may likewise be advantageous to use two different active materials for the active material 102 and the active material core 806. In particular, the first active material for the active material 102 may be selected as a high capacity active material having a substantially higher capacity relative to the second active material of the active material core 806, which may be selected as a moderate-to-low capacity active material. In this way, a hybrid structure is provided that advantageously combines the benefits of the high capacity materials discussed above with those of a low-to-moderate capacity active material particle(s).

In particular, the low-to-moderate capacity (e.g., intercalation-type) particles may provide high rate capability to the resultant composite, while the high capacity active nanoparticles enhance the (ion storage) energy storage properties of the composite. As a result, battery electrodes produced from composites of this type comprising low capacity particles and high capacity active nanoparticles distributed within a porous scaffolding matrix may offer higher energy density than conventional intercalation type electrodes and higher power density than electrodes composed of high capacity nanoparticles alone. In addition, such composites may offer enhanced structural stability because low capacity particles commonly exhibit low volume changes (below about 8 vol. %) during battery operation.

It will be appreciated that in addition to the singularly illustrated particle making up the active material core 806 in FIG. 8, several such particles may be utilized in combination as desired. Moreover, such particles may be of different chemistry and blended/mixed together in a variety of forms to create composite particles providing the advantages described herein through an interpenetrating network of different types of active materials. By using a combination of different particles, both the voltage profile of an electrode and the power density vs. energy density of an electrode can be tuned to desired specifications.

Several example methods of fabrication for hybrid composite structures of the type described above are provided below. The methodologies may be similar, at least in some respects, to the previously discussed fabrication methods.

According to one example method, high capacity active particles may be introduced into a pre-fabricated porous carbon scaffold shell around intercalation-type low capacity active material particles via chemical vapor deposition (CVD).

According to another example method, high capacity active particles may be introduced into a pre-fabricated porous carbon scaffold shell around intercalation-type low capacity active material particles via vapor infiltration and/or capillary condensation.

According to another example method, active particles may be introduced into a pre-fabricated porous carbon scaffold shell by: (i) dissolving active particles or active particle precursors in a solvent; (ii) infiltration of the solution into the pores of pre-fabricated porous carbon matrix under normal pressure or at increased pressures or under vacuum; (iii) evaporation of the solvent; and (iv) (if needed) transformation of the precursor into the active particles. In some cases, some of these steps may be repeated to increase the total amount of the introduced nanoparticles of active material into the porous carbon matrix.

According to another example method, active particles are introduced into a pre-fabricated porous carbon scaffold shell by: (i) dissolving active particles or active particle precursors in a solvent; (ii) infiltration of the solution into the pores of pre-fabricated porous carbon matrix under normal pressure or at increased pressures or under vacuum; (iii) heterogeneous precipitation of nano particles on the inner carbon surface from the solution by, for example, adding a non-solvent, changing ionic strength or pH of the solution, or changing temperature/pressure of the system; and (iv) (if needed) transformation of the precursor into the active particles. In some cases, some of these steps may be repeated to increase the total amount of the introduced nanoparticles of active material into the porous carbon matrix.

According to another example method, active particles may be introduced into a pre-fabricated porous carbon scaffold shell by infiltration of nanoparticles of active material into the pores of pre-formed porous carbon using a suspension infiltration method under normal pressure, at increased pressures, or under vacuum.

According to another example method, the following may be performed: (i) active nanoparticles may be first adsorbed onto the surface of the nanoparticles of a polymeric precursor for carbon formation (e.g., by introduction of the opposite charge on the surface of the active nanoparticles and the surface of the polymer precursor nanoparticles); (ii) the active nanoparticle-polymer mixture may be coated on the surface of large size (e.g., greater than about 0.5 micron in diameter) intercalation-type low capacity active material particles; (iii) thermal treatment that induces carbonization of the polymer precursor and the formation of the nanocomposite shell comprising active nanoparticles, carbon and nanopores; and (iv) optional activation to increase the volume of pores. In another example, after the nanoparticle deposition, the composite polymer nanoparticles may be covered with another carbon-forming polymer layer by the electrostatic adsorption of a polymer having opposite surface charge than that of the particles.

According to another example method, the following may be performed: (i) active nanoparticles and polymer precursor nanoparticles may be coagulated heterogeneously from a solution/suspension onto the surface of the large size (e.g., greater than about 0.5 micron in diameter) intercalation-type low capacity active material particles; (ii) thermal annealing (carbonization) to form the nanocomposite shells with nanoparticles uniformly distributed within carbon and pores; and (iii) optional activation to increase the volume of pores. In another example, the large size nanoparticles covered with active/polymer nanoparticles may be covered with another layer of a carbon-forming polymer before carbonization.

According to another example method, the following may be performed: (i) active nanoparticles may first be dispersed in a monomer or polymer solution; (ii) the produced suspension mixed with large size (e.g., greater than about 0.5 micron in diameter) intercalation-type low capacity active material particles may be emulsified (e.g., in water) to produce spherical high capacity nanoparticle low-capacity particle-polymer colloids in water; (iii) the monomer in the colloids may be polymerized (or solvent may be extracted from a polymer solution) to produce the spherical composite particles composed of active high capacity nanoparticles, low capacity particles, and a polymer; (iv) upon water evaporation the composite particles may be carbonized; and (v) the produced carbon-active nanoparticle composite may (optionally) be activated to increase the volume of pores. In another example, polymerization may be conducted in a non-aqueous solvent for the monomer which is a non-solvent for the polymer being synthesized. During the polymerization, the polymer particles may be formed by a precipitation mechanism. In course of the precipitation, polymerization if the active nanoparticles/large particles may become captured inside the polymer particles. Upon solvent evaporation, the composite particles may be carbonized.

According to another example method, the following may be performed: (i) water with active high capacity particle precursors and low capacity active particles may be emulsified in a monomer solution; (ii) the produced mixture may be emulsified in water again to produce colloids of the monomer solution (inside of which there may be colloids of active particle precursor); (iii) the monomer may be polymerized producing near-spherical polymer particles containing the distribution of precursors of active particles and comprising active particles; (iv) the produced emulsion may be dried, calcinated/carbonized to produce porous carbon particles with incorporated particles of active material; and (v) the produced carbon-active nanoparticle composite may be (optionally) activated to increase the volume of pores. An analogous approach may be realized in a non-aqueous medium as mentioned above.

According to another example method, the following may be performed: (i) an active particle precursor may be dissolved in an organic solvent along with a suitable carbon forming polymer; (ii) the solution may be mixed with low capacity active particles to form a suspension; (iii) the suspension may be mixed with an excess of a non-solvent for the active particle precursor and the polymer, and composite particles may be formed by precipitation; and (iv) the produced particles may be dried, and calcinated/carbonized to produce porous carbon particles with incorporated nanoparticles of active material. In another example, the precipitation may be conducted via changing the ionic strength or pH of the solution, or changing the temperature/pressure of the system.

It will further be appreciated that the active material core design of FIG. 8 may be used in combination with any of the shell designs discussed above. Two examples are discussed below with regard to FIGS. 9-10.

Figure 9:
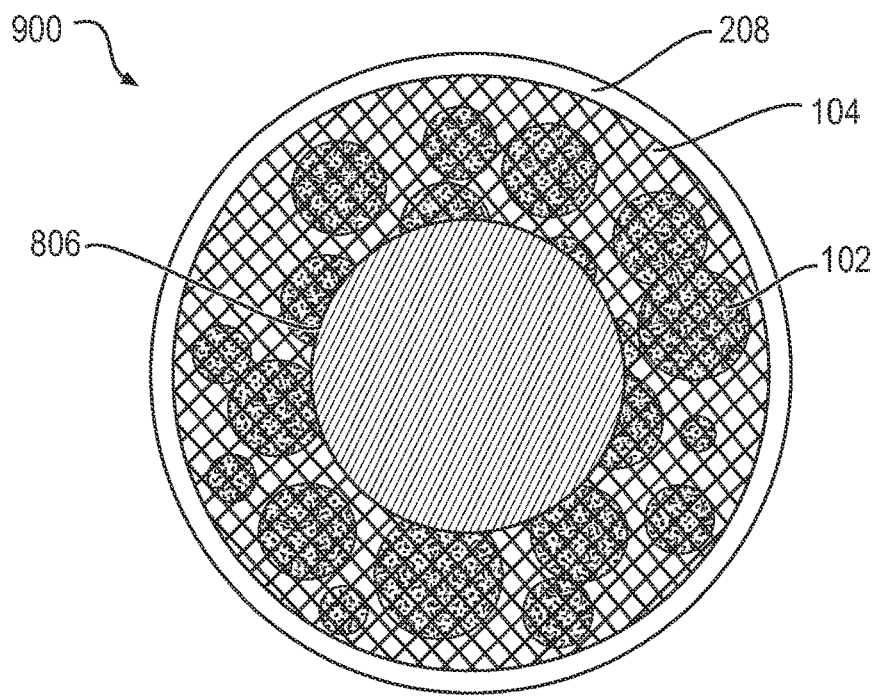
FIG. 9 illustrates an example battery electrode composition design incorporating an active material core and a functional shell according to other example embodiments.

FIG. 9 illustrates an example battery electrode composition design incorporating an active material core and a functional shell according to other example embodiments. As shown, the composite particle 900 of FIG. 9 includes the active material 102 and the porous, electrically-conductive scaffolding matrix 104 within which the active material 102 is disposed, as well as the shell 208 at least partially encasing the active material 102 and the scaffolding matrix 104, as in the design of FIG. 2. The composite particle 900 of FIG. 9 still further includes the active material core 806, as in the design of FIG. 8. In this example, the shell 208 is specifically, or otherwise includes, a protective layer formed from a material that is substantially impermeable to electrolyte solvent molecules.

Figure 10:
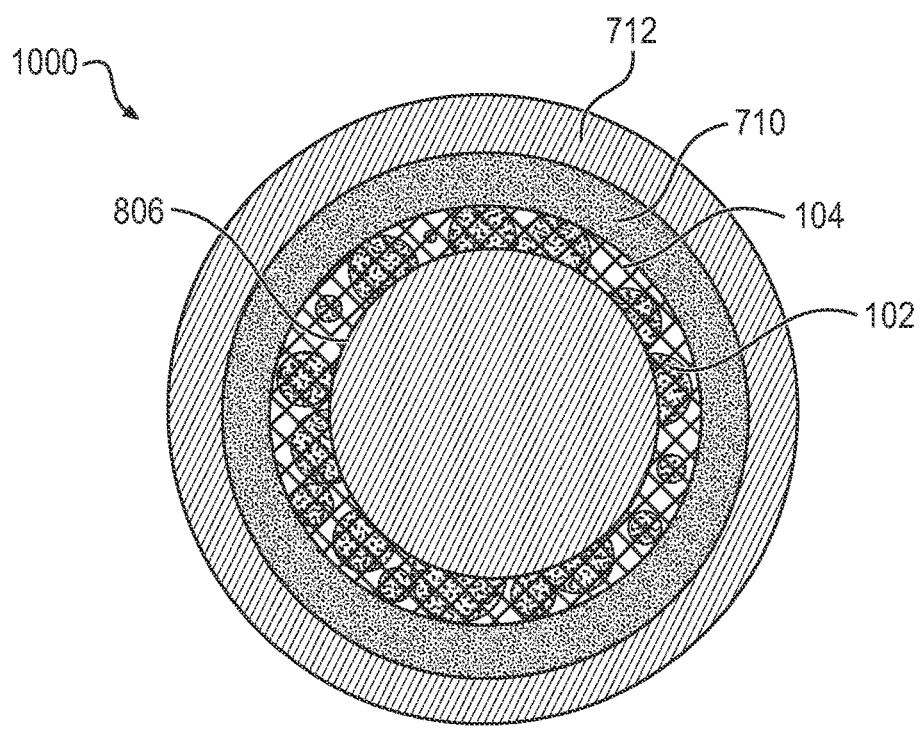
FIG. 10 illustrates another example battery electrode composition design incorporating an active material core and a functional shell according to other example embodiments.

FIG. 10 illustrates another example battery electrode composition design incorporating an active material core and a functional shell according to other example embodiments. As shown, the composite particle 1000 of FIG. 10 includes the active material 102 and the porous, electrically-conductive scaffolding matrix 104 within which the active material 102 is disposed, as well as the multi-layered composite material shell having an inner layer 710 and an outer layer 712, as in the design of FIG. 7, each at least partially encasing the active material 102 and the scaffolding matrix 104. The composite particle 1000 of FIG. 10 still further includes the active material core 806, as in the design of FIG. 8. In this example, the inner shell layer 710 is a porous layer having a smaller average pore size than the scaffolding matrix 104, while the outer layer 712 is an active material layer formed from an active material that is different from the active material disposed within the scaffolding matrix 104, but which may be the same as the active material of the active material core 806.

In some applications it may be desirable to further increase ion transport within the composite particle structure. It may therefore be advantageous to provide so-called external "channel" pores designed to provide faster ion diffusion and thus improve power performance characteristics.

Figure 11:
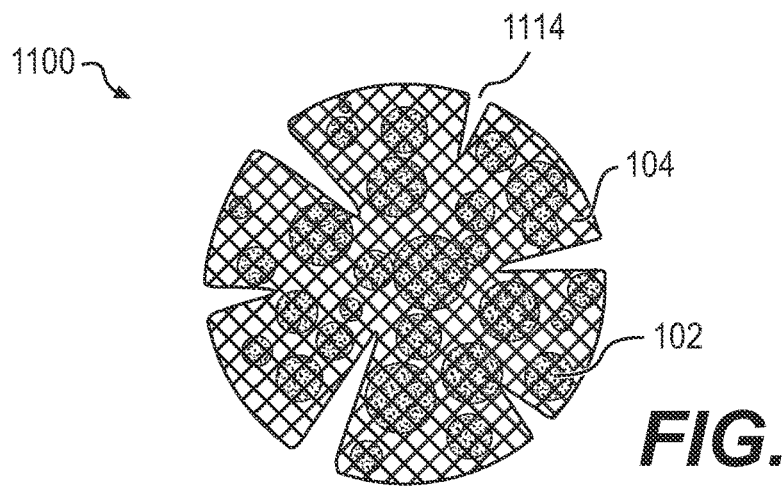
FIG. 11 illustrates an example battery electrode composition design incorporating external channel pores according to other example embodiments.

FIG. 11 illustrates an example battery electrode composition design incorporating external channel pores according to other example embodiments. As shown, the composite particle 1100 of FIG. 11 includes the active material 102 and the porous, electrically-conductive scaffolding matrix 104 within which the active material 102 is disposed, as in the design of FIG. 1, and further includes channel pores 1114 extending from an outer surface of the scaffolding matrix 104 towards the center of the scaffolding matrix 104. In this way, the channel pores 1114 provide channels for faster diffusion of the ions from the electrolyte into the active material 102 disposed within the scaffolding matrix 104 by reducing the average diffusion distance of the ions.

More specifically, the pores in the scaffolding matrix may be relatively small (for example, on the order of about 0.5-5 nm) and, in some cases (when, for example, the electrolyte infiltrates the pores) provide slow ion transport into the core of the composite particle. By forming larger channel pores (for example, on the order of about 10-30 nm) propagating from the external surface of the particle into the core and having significantly faster ion diffusion rates, the rate performance of an electrode composed of such particles may be significantly improved. In some cases, for example when the electrolyte infiltrates the smaller scaffolding matrix pores and partially decomposes at low potentials to form an SEI layer having relatively low ionic conductivity, the channel pores partially free from the SEI similarly provide high rate performance.

In some embodiments, the channel pores may be filled with one or more functional materials to provide other benefits as desired for a given application.

Figure 12:
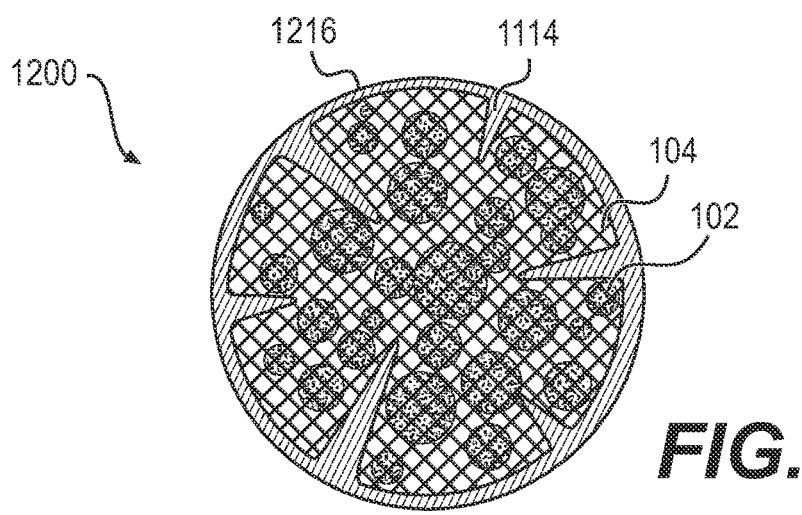
FIG. 12 illustrates an example battery electrode composition design incorporating external channel pores and a filler material according to other example embodiments.

FIG. 12 illustrates an example battery electrode composition design incorporating external channel pores and a filler material according to other example embodiments. As shown, the composite particle 1200 of FIG. 12 includes the active material 102 and the porous, electrically-conductive scaffolding matrix 104 within which the active material 102 is disposed, as well as the channel pores 1114 extending from an outer surface of the scaffolding matrix 104 towards the center of the scaffolding matrix 104, as in the design of FIG. 11. The composite particle 1200 of FIG. 12 still further includes a filler material 1216 such that at least some of the external channel pores 1114 are filled with the filler material 1216. In this example, the filler material 1216 is specifically, or otherwise includes, an active material that is different from the active material 102 disposed within the scaffolding matrix 104. This second type of active material may be similar to that described above with reference to FIG. 3, and may provide similar advantages by having two types of active materials within a composite particle, including improved structural stability of the particle, providing fast ion access to the scaffolding matrix, further reducing particle volume changes during battery operation, blocking electrolyte solvent access to the core of the particle, and so on.

Figure 13:
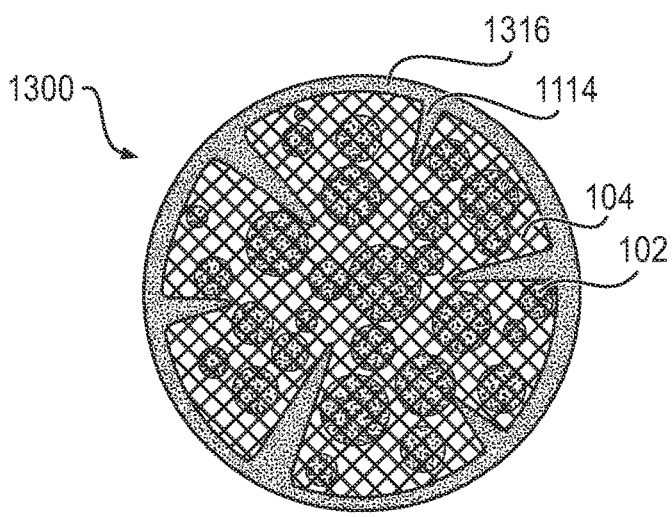
FIG. 13 illustrates another example battery electrode composition design incorporating external channel pores and a filler material according to other example embodiments.

FIG. 13 illustrates another example battery electrode composition design incorporating external channel pores and a filler material according to other example embodiments. As shown, the composite particle 1300 of FIG. 13 includes the active material 102 and the porous, electrically-conductive scaffolding matrix 104 within which the active material 102 is disposed, as well as the channel pores 1114 extending from an outer surface of the scaffolding matrix 104 towards the center of the scaffolding matrix 104 and a filler material 1316 such that at least some of the external channel pores 1114 are filled with the filler material 1316, as in the design of FIG. 12. In this example, however, the filler material 1316 is specifically, or otherwise includes, a porous material having a different microstructure than the scaffolding matrix (e.g., different pore size, pore density, etc.). The porous material may be similar to that described above with reference to FIG. 4, and may provide similar advantages by having two types of porous structures within a composite particle.

Figure 14:
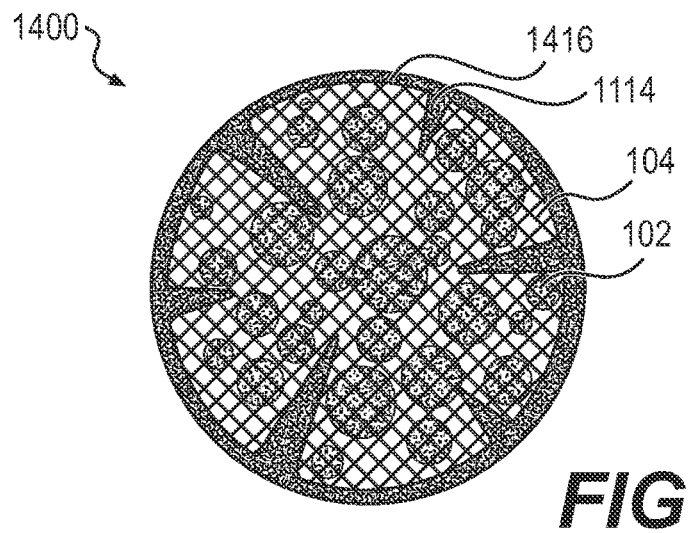
FIG. 14 illustrates another example battery electrode composition design incorporating external channel pores and a filler material according to other example embodiments.

FIG. 14 illustrates another example battery electrode composition design incorporating external channel pores and a filler material according to other example embodiments. As shown, the composite particle 1400 of FIG. 14 includes the active material 102 and the porous, electrically-conductive scaffolding matrix 104 within which the active material 102 is disposed, as well as the channel pores 1114 extending from an outer surface of the scaffolding matrix 104 towards the center of the scaffolding matrix 104 and a filler material 1416 such that at least some of the external channel pores 1114 are filled with the filler material 1416, as in the designs of FIGS. 12 and 13. In this example, the filler material 1416 includes a porous material, as in the design of FIG. 13, but the pores of the porous material are at least partially filled with a second active material different from the active material 102 disposed within the scaffolding matrix 104. This composite filler arrangement may be similar to that described above with reference to FIG. 5, and may provide similar advantages by having the active material 102 disposed within the scaffolding matrix 104 formed from a first active material while at least some pores in the porous filler material 1416 are infiltrated with a second active material.

It will be appreciated that other types of filler materials may be used as well for different applications. For example, when the electrolyte does not infiltrate the smaller scaffolding matrix pores and when ionic conductivity of the scaffolding matrix is relatively low, the larger channel pores may be filled either with another electrolyte (e.g., a solid electrolyte material) or, more generally, with an ionically conductive material to similarly provide higher rate performance to the composite particles.

It will further be appreciated that the channel pore designs of FIGS. 11-14 may be used in combination with any of the shell designs discussed above. Two examples are discussed below with regard to FIGS. 15-16.

Figure 15:
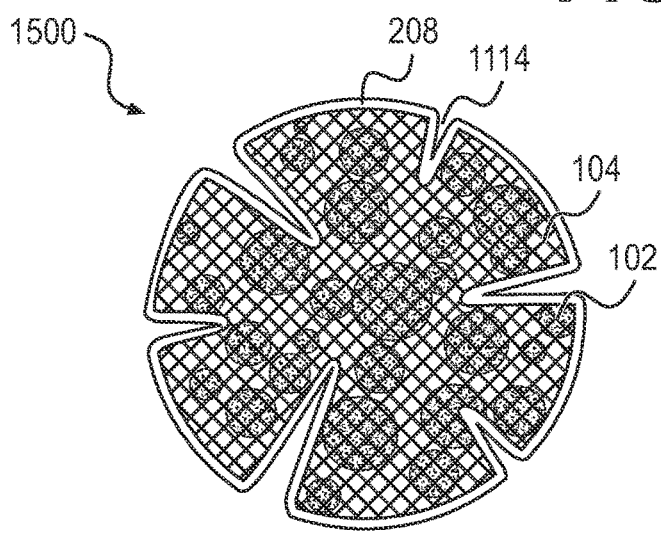
FIG. 15 illustrates an example battery electrode composition design incorporating external channel pores and a functional shell according to other example embodiments.

FIG. 15 illustrates an example battery electrode composition design incorporating external channel pores and a functional shell according to other example embodiments. As shown, the composite particle 1500 of FIG. 15 includes the active material 102 and the porous, electrically-conductive scaffolding matrix 104 within which the active material 102 is disposed, as well as the channel pores 1114 extending from an outer surface of the scaffolding matrix 104 towards the center of the scaffolding matrix 104, as in the design of FIG. 11. The composite particle 1500 of FIG. 15 still further includes the shell 208 at least partially encasing the active material 102 and the scaffolding matrix 104, as in the design of FIG. 2. In this example, the shell 208 is specifically, or otherwise includes, a protective layer formed from a material that is substantially impermeable to electrolyte solvent molecules. In some designs it is advantageous for this shell to at least partially coat the inner walls of the channel pores.

Figure 16:
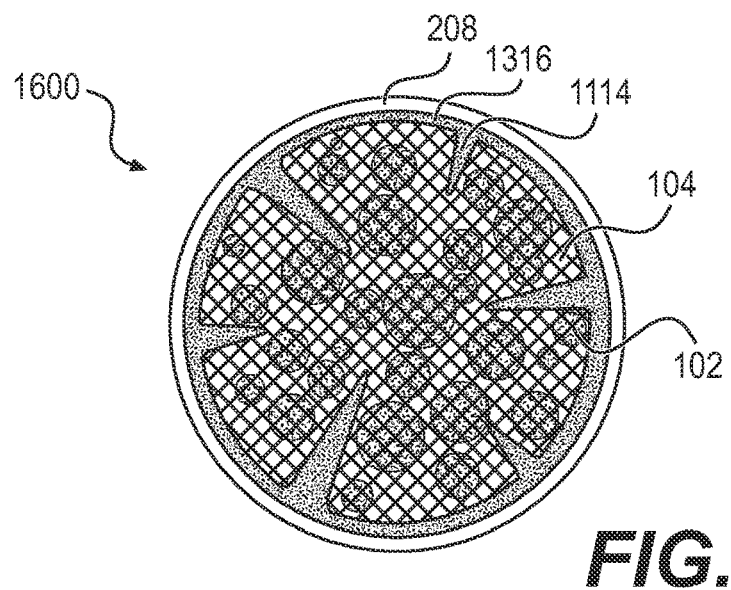
FIG. 16 illustrates an example battery electrode composition design incorporating external channel pores, a filler material, and a functional shell according to other example embodiments.

FIG. 16 illustrates an example battery electrode composition design incorporating external channel pores, a filler material, and a functional shell according to other example embodiments. As shown, the composite particle 1600 of FIG. 16 includes the active material 102 and the porous, electrically-conductive scaffolding matrix 104 within which the active material 102 is disposed, as well as the channel pores 1114 extending from an outer surface of the scaffolding matrix 104 towards the center of the scaffolding matrix 104 and the filler material 1316 (e.g., a porous material) such that at least some of the external channel pores 1114 are filled with the filler material 1316, as in the designs of FIG. 13. The composite particle 1600 of FIG. 16 still further includes the shell 208 at least partially encasing the active material 102 and the scaffolding matrix 104, as in the design of FIG. 2, as well as the filler material 1316. In this example, the shell 208 is specifically, or otherwise includes, a protective layer formed from a material that is substantially impermeable to electrolyte solvent molecules.

It will be appreciated that the different composite particle structures provided herein can be formed in a variety of ways. Several example formation methods have already been provided herein, and several more are described below.

Figure 17:
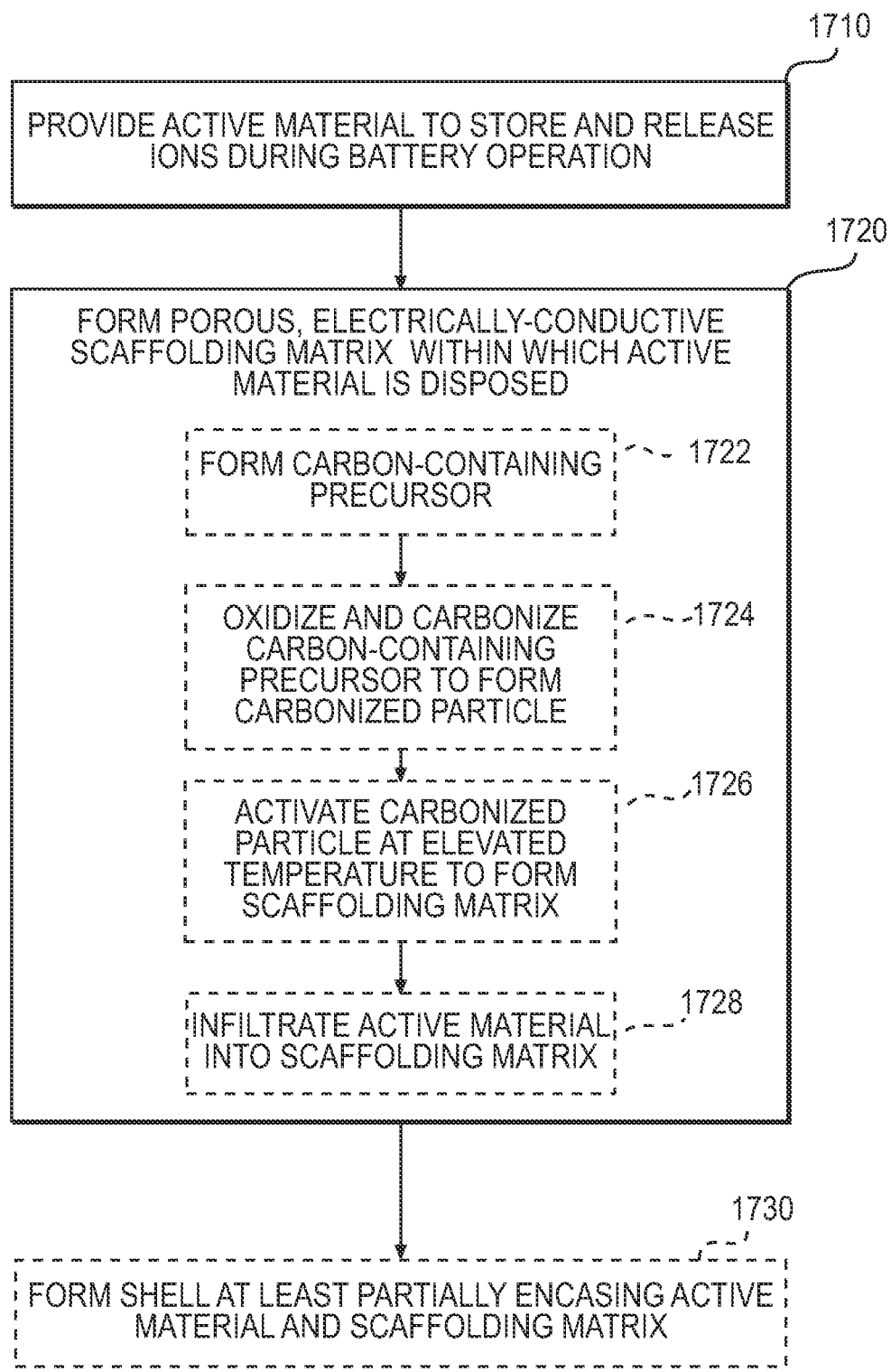
FIG. 17 is a flowchart illustrating an example method of fabricating a battery electrode composition according to various example embodiments.

FIG. 17 is a flowchart illustrating an example method of fabricating a battery electrode composition according to various example embodiments. In this example, an active material is provided to store and release ions during battery operation (block 1710). As discussed above, the storing and releasing of the ions may cause a substantial change in volume of the active material. Accordingly, a porous, electrically-conductive scaffolding matrix is provided within which the active material may be disposed (block 1720). As also discussed above, the scaffolding matrix structurally supports the active material, electrically interconnects the active material, and accommodates the changes in volume of the active material.

The scaffolding matrix may be formed in a variety of ways. In one example illustrated here, the scaffolding matrix may be formed by forming a carbon-containing precursor (optional block 1722), oxidizing (e.g., to increase carbonization yield) and carbonizing the carbon-containing precursor to form a carbonized particle (optional block 1724), and activating the carbonized particle at elevated temperature to form the scaffolding matrix (optional block 1726). Forming the scaffolding matrix may further comprise infiltration of the active material into the scaffolding matrix (optional block 1728), which may be performed by (i) chemical vapor deposition, (ii) solution infiltration followed by solvent evaporation, (iii) solution infiltration followed by solvent evaporation and annealing, (iv) solution infiltration followed by precipitation during nonsolvent addition, (v) sol-gel, (vi) vapor infiltration, (vii) atomic layer deposition, (viii) electroplating, (ix) melt infiltration, or other techniques described herein.

According to various designs, a shell may also be formed at least partially encasing the active material and the scaffolding matrix (optional block 1730). The shell may be made substantially permeable to the ions stored and released by the active material. The shell may also be formed as a composite material comprising an inner layer and an outer layer. In one example, the inner layer may be a porous layer having a smaller average pore size than the scaffolding matrix. The outer layer may be a protective layer formed from a material that is substantially impermeable to electrolyte solvent molecules, an active material layer formed from an active material that is different from the active material disposed within the scaffolding matrix, or other material layers discussed variously herein.

FIGS. 18-23 provide further examples of process steps that can be utilized for the fabrication of some of the described composite particle structures.

FIG. 18 is a graphical flow diagram from a cross-sectional perspective depicting formation of an example composite particle of the type illustrated in FIG. 1 or 3 according to certain example embodiments. In this example, carbon precursor particles (such as for example organic particles, including polymer particles, carbohydrate particles, and others) are first produced using one of several known methods, such as those previously described (block 1810). By partial oxidation, carbonization, annealing in an inert environment, and activation, these precursor particles can be transformed into porous carbon particles (blocks 1820-1830). The pore size distribution and the porosity of the final particles can be controlled by multiple parameters, such as the pore size and pore volume present in the carbon precursor, by the composition and microstructure of the carbon precursor, by the oxidation, annealing, and activation conditions, and so on. After formation, the porous carbon scaffold can be infiltrated with high capacity active particles using one of the gaseous or liquid chemistry routes previously described or by using a combination of infiltration approaches (block 1840). Subsequently, an external shell may be formed of, for example, a low-to-moderate capacity (e.g., intercalation-type) active material by using one or a combination of previously described methods (chemical vapor deposition, sol gel, precipitation, etc.) (block 1850).

FIG. 19 is a graphical flow diagram from a cross-sectional perspective depicting formation of an example composite particle of the type illustrated in FIG. 8 according to certain example embodiments. In this example, a carbon precursor (for example, a polymer) coating is first applied onto the surface of low-to-moderate capacity active particles (block 1910). After polymer partial oxidation and at least partial carbonization (at temperatures below the thermal stability limit of the active particles) (block 1920), the porous scaffold is formed (block 1930). In order to enhance the scaffold porosity, the material can be further activated (similarly, under such conditions that do not induce significant damage into the active particle(s) core). Subsequently, the porous scaffold is infiltrated with high capacity active particles (block 1940).

Figure 20:
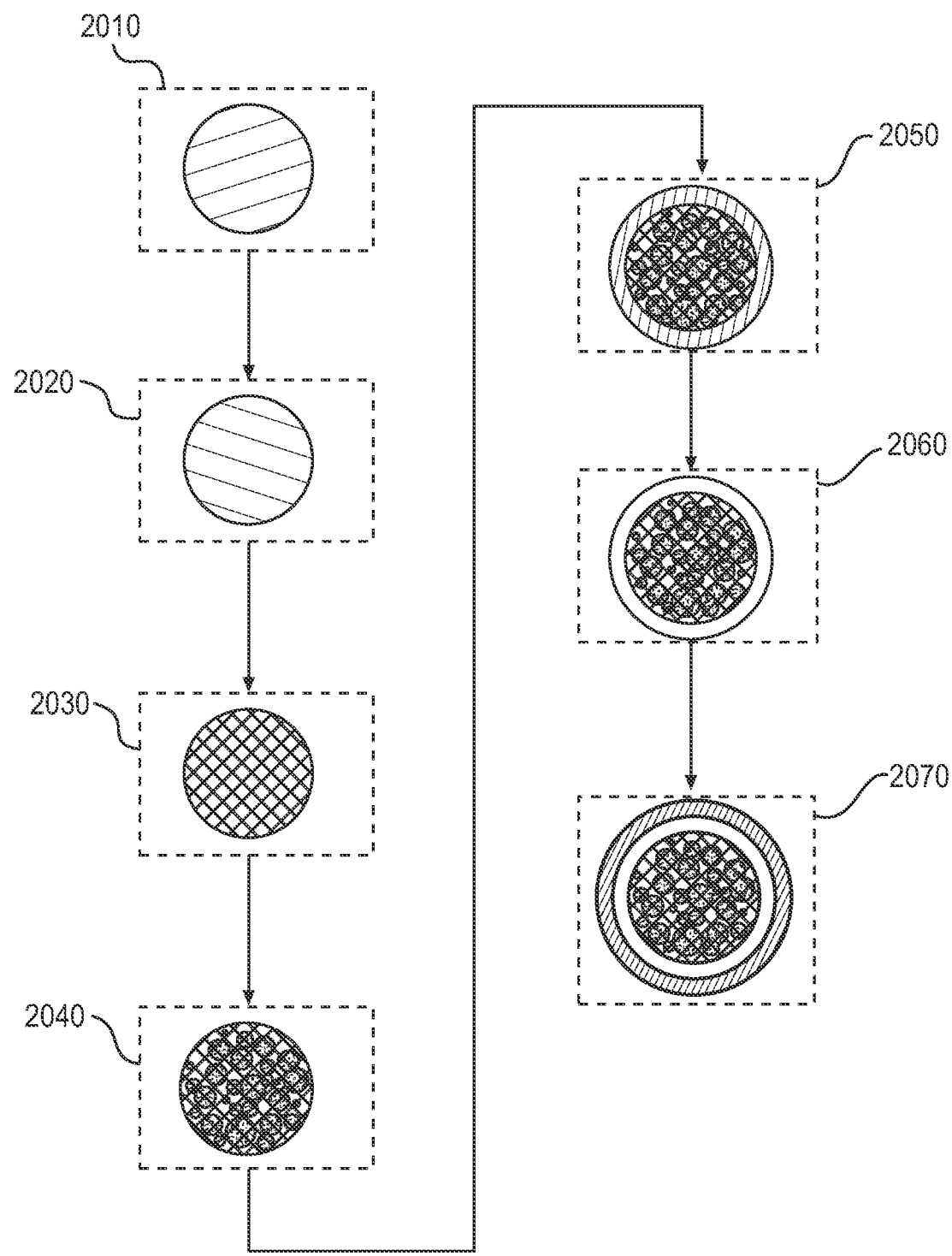
FIG. 20 is a graphical flow diagram from a cross-sectional perspective depicting formation of an example composite particle of the type illustrated in FIG. 4, 5, or 7 according to certain example embodiments.

FIG. 20 is a graphical flow diagram from a cross-sectional perspective depicting formation of an example composite particle of the type illustrated in FIG. 4, 5, or 7 according to certain example embodiments. In this example, after the formation of scaffold particles infiltrated with active material nanoparticles (blocks 2010-2040, corresponding to blocks 1810-1840 and described in more detail above), another (largely external) layer of a carbon precursor (such as a polymer) is introduced (block 2050) and carbonized under conditions which do not induce undesirable damages or changes in chemical composition of the active nanoparticles (block 2060). As a result, the particles are provided with a porous shell layer. The outer surface of such a layer can be sealed by an electrolyte ion permeable and solvent impermeable layer (not shown). In some designs, an external shell of low-to-moderate capacity (e.g., intercalation-type) active material is deposited on the top or infiltrated within the top porous scaffold shell layer (block 2070).

Figure 21:
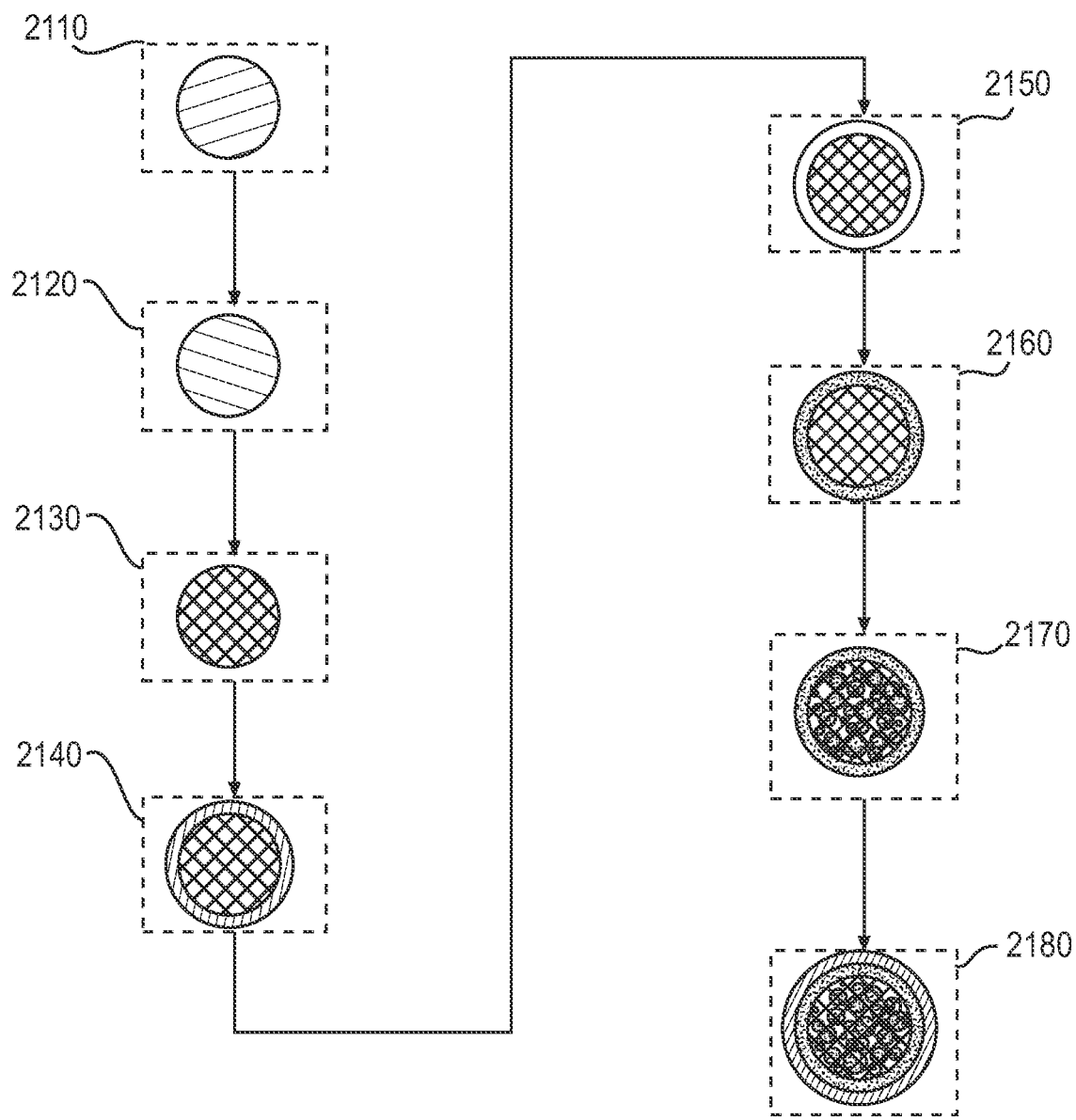
FIG. 21 is a graphical flow diagram from a cross-sectional perspective depicting formation of an example composite particle of the type illustrated in FIG. 5 or 7 according to certain example embodiments.

FIG. 21 is a graphical flow diagram from a cross-sectional perspective depicting formation of an example composite particle of the type illustrated in FIG. 5 or 7 according to certain example embodiments. In this example, the active particles are infiltrated into the porous core-shell scaffold (block 2170) after the formation of a porous shell layer (blocks 2110-2160). The advantage of this approach is that conditions that would normally damage active particles (e.g., high processing temperatures or processing under hydrogen-containing or oxygen-containing environment) can be utilized for the formation of the scaffold particles. Additional shell layers may be added as desired (block 2180).

Figure 22:
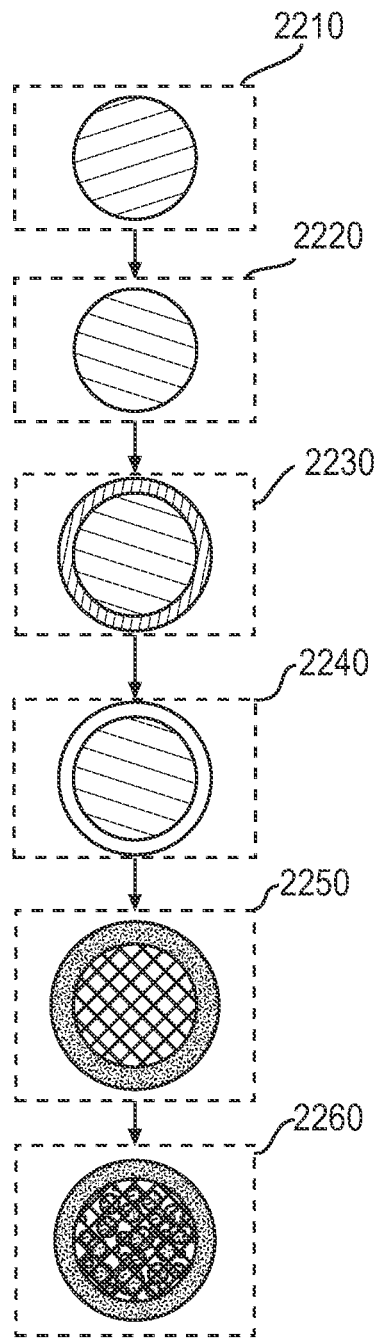
FIG. 22 is a graphical flow diagram from a cross-sectional perspective depicting formation of an example composite particle of the type illustrated in FIG. 4 according to certain example embodiments.

FIG. 22 is a graphical flow diagram from a cross-sectional perspective depicting formation of an example composite particle of the type illustrated in FIG. 4 according to certain example embodiments. In this example, a shell layer of a porous scaffold is introduced (block 2230-2240) after carbonization of the scaffold core (blocks 2210-2220), but before activation of the scaffold core. The activation step (block 2250) is conducted on scaffold particles comprising both the carbonized core and carbonized shell. The final step involves infiltration of active particles into the pores of the scaffold (block 2260).

Figure 23:
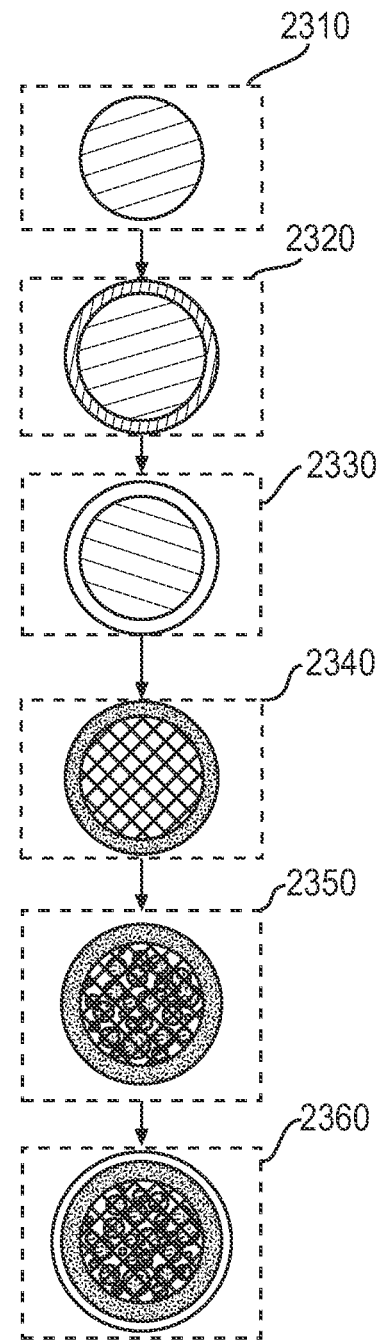
FIG. 23 is a graphical flow diagram from a cross-sectional perspective depicting formation of an example composite particle of the type illustrated in FIG. 4 or 6 according to certain example embodiments.

FIG. 23 is a graphical flow diagram from a cross-sectional perspective depicting formation of an example composite particle of the type illustrated in FIG. 4 or 6 according to certain example embodiments. It is similar to what is described by FIG. 22 (blocks 2310 and 2330-2350), but the core-shell carbon precursor particles are formed before their carbonization and subsequent activation (block 2320). Further, as previously described, after infiltration by active particles, the outer layer of the scaffold can be sealed with a layer that is essentially permeable to electrolyte ions but largely impermeable to electrolyte solvent (block 2360). Such a layer may also be made electrically conductive (e.g., by comprising $sp^2$ bonded carbon).

Figure 24:
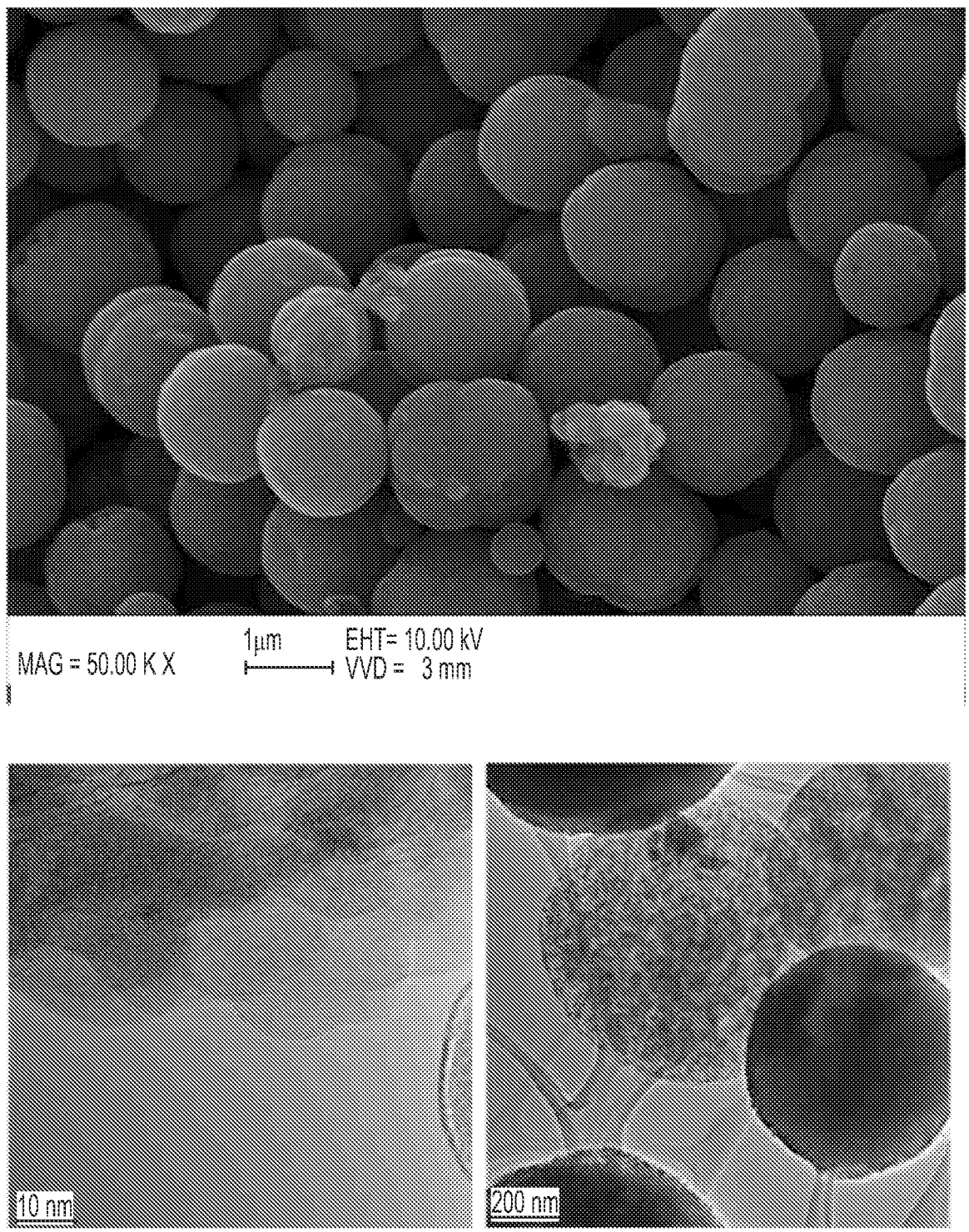
FIG. 24 shows SEM and TEM images of an example carbon scaffold particle fabricated with silicon nanoparticles deposited therein.

FIG. 24 shows SEM and TEM images of an example carbon scaffold particle fabricated with silicon nanoparticles deposited therein.

Figure 25:
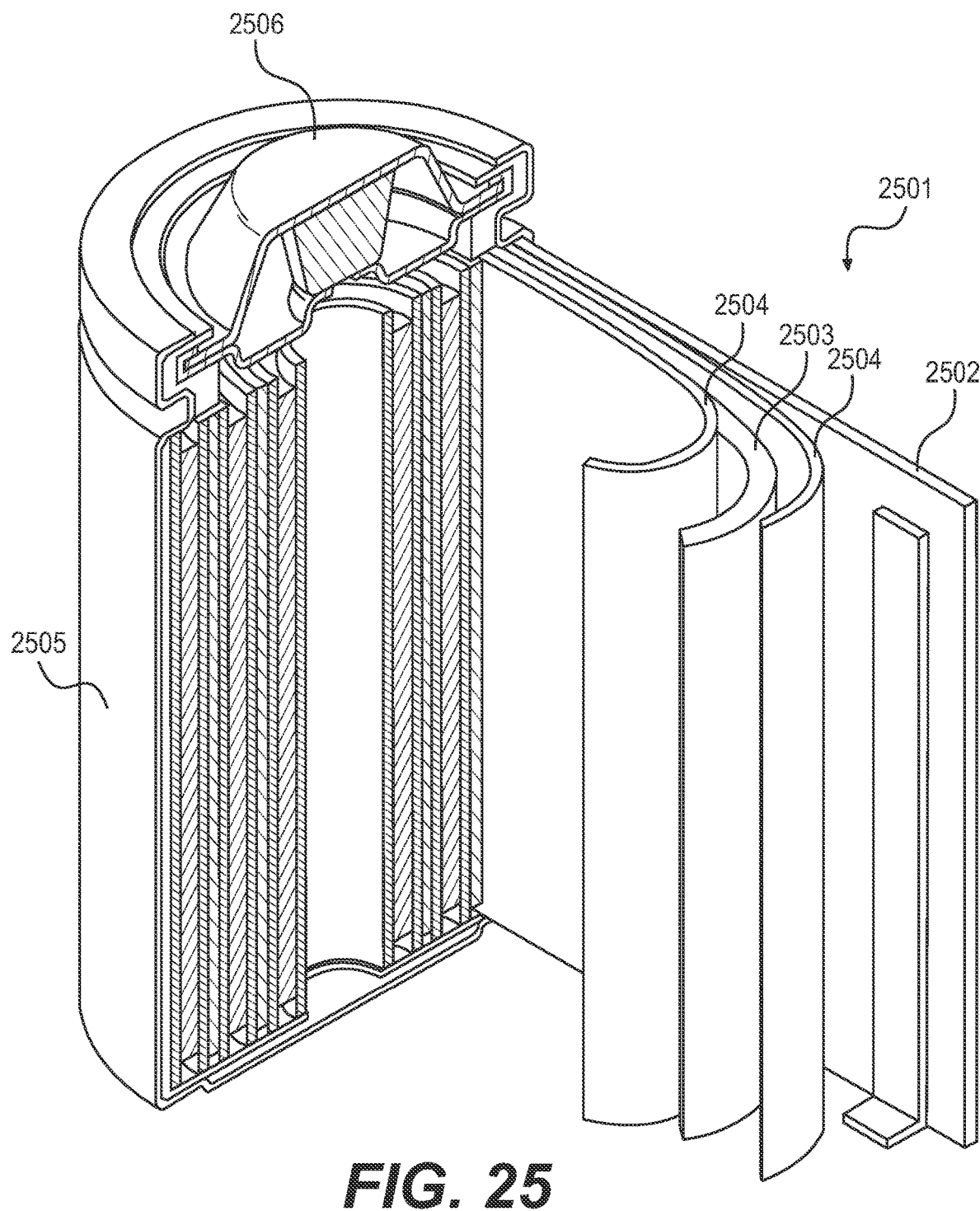
FIG. 25 illustrates an example battery (e.g., Li-ion) in which the components, materials, methods, and other techniques described herein, or combinations thereof, may be applied according to various embodiments.

FIG. 25 illustrates an example battery (e.g., Li-ion) in which the components, materials, methods, and other techniques described herein, or combinations thereof, may be applied according to various embodiments. A cylindrical battery is shown here for illustration purposes, but other types of arrangements, including prismatic or pouch (laminate-type) batteries, may also be used as desired. The example battery 2501 includes a negative anode 2502, a positive cathode 2503, a separator 2504 interposed between the anode 2502 and the cathode 2503, an electrolyte (not shown) impregnating the separator 2504, a battery case 2505, and a sealing member 2506 sealing the battery case 2505.

The forgoing description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention.

The invention claimed is:

1. A battery anode electrode composition, comprising:
    a composite particle, comprising:
       Si-comprising active material that is electrochemically reactive with metal ions during battery operation; and
       a porous scaffolding matrix comprising a monolithic particle within which the Si-comprising active material is at least partially disposed,
       wherein the porous scaffolding matrix electrically interconnects the Si-comprising active material.

2. A battery anode electrode composition of claim 1, further comprising:
    a coating to inhibit contact of solvent molecules of an electrolyte with the Si-comprising active material.

3. A battery anode electrode composition of claim 1, further comprising:
    a coating permeable to the metal ions.

4. A battery anode electrode composition of claim 1, wherein the monolithic particle comprises carbon.

5. A battery anode electrode composition of claim 1, wherein the metal ions comprise one or more of: $Li^+$, $Na^+$, $Mg^{2+}$, or $Ca^{2+}$.

6. A cylindrical, prismatic, or pouch battery, comprising:
an anode and a cathode,
wherein the anode comprises the battery anode electrode composition of claim 1.

7. A battery anode electrode composition of claim 1, wherein the porous scaffolding matrix comprises one or more micropores with a first pore size below 2 nm and one or more mesopores with a second pore size between 2 nm and 50 nm.

8. A battery anode electrode composition of claim 7, wherein the metal ions comprise one or more of: $Li^+$, $Na^+$, $Mg^{2+}$, or $Ca^{2+}$.

9. A cylindrical, prismatic, or pouch battery, comprising:
an anode and a cathode,
wherein the anode comprises the battery anode electrode composition of claim 7.

10. A battery anode electrode composition of claim 1, wherein a pore size of one or more pores in the porous scaffolding matrix is in a range from 0.5 nm to 5 nm.

11. A battery anode electrode composition of claim 10, wherein the metal ions comprise one or more of: $Li^+$, $Na^+$, $Mg^{2+}$, or $Ca^{2+}$.

12. A cylindrical, prismatic, or pouch battery, comprising:
an anode and a cathode,
wherein the anode comprises the battery electrode composition of claim 10.

13. A method of fabricating a battery anode electrode composition comprising at least one composite particle, the method comprising:
forming a porous scaffolding matrix by:
carbonizing a polymer monolith to form a carbon monolith;
forming at least one monolithic particle from the carbon monolith;
activating the at least one monolithic particle; and
introducing Si-comprising active material into the at least one monolithic particle.

14. A method of fabricating a battery anode electrode composition comprising a composite particle, the method comprising:
forming a porous scaffolding matrix comprising a monolithic particle within which Si-comprising active material is at least partially disposed,
wherein the Si-comprising active material is electrochemically reactive with metal ions during battery operation, and
wherein the porous scaffolding matrix electrically interconnects the Si-comprising active material.

15. The method of claim 14, wherein the porous scaffolding matrix comprises one or more micropores with a first pore size below 2 nm and one or more mesopores with a second pore size between 2 nm and 50 nm.

16. The method of claim 14, wherein the metal ions comprise one or more of: $Li^+$, $Na^+$, $Mg^{2+}$, or $Ca^{2+}$.

17. A method of fabricating a battery anode electrode composition comprising a composite particle, the method comprising:
forming a porous scaffolding matrix by:
carbonizing a precursor particle to form a carbonized particle; and
activating the carbonized particle; and
introducing Si-comprising active material into the matrix, wherein the Si-comprising active material is electrochemically reactive with metal ions during battery operation.

18. The method of claim 17, wherein the metal ions comprise one or more of: $Li^+$, $Na^+$, $Mg^{2+}$, or $Ca^{2+}$.

19. The method of claim 17, additionally comprising:
processing the precursor particle,
wherein the processing of the precursor particle is done before carbonizing the precursor particle.

20. The method of claim 19, wherein the processing of the precursor particle comprises oxidizing the precursor particle.

21. The method of claim 17, further comprising:
covering the composite particle with a polymer layer.

22. The method of claim 21, wherein the polymer layer is carbon forming.

* * * * *